US012651554B2

(12) United States Patent
Yuan

(10) Patent No.: US 12,651,554 B2
(45) Date of Patent: Jun. 9, 2026

(54) DISPLAY PANEL AND DISPLAY DEVICE

(71) Applicant: Xiamen Tianma Display Technology Co., Ltd., Xiamen (CN)

(72) Inventor: Yong Yuan, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 460 days.

(21) Appl. No.: 18/103,710

(22) Filed: Jan. 31, 2023

(65) Prior Publication Data

US 2023/0178008 A1 Jun. 8, 2023

(30) Foreign Application Priority Data

Aug. 25, 2022 (CN) ......................... 202211028570.2

(51) Int. Cl.
*G09G 3/32* (2016.01)

(52) U.S. Cl.
CPC ......... *G09G 3/32* (2013.01); *G09G 2310/061* (2013.01); *G09G 2320/0233* (2013.01)

(58) Field of Classification Search
CPC .. G09G 3/3233; G09G 3/3266; G09G 3/3283; G09G 2300/0819; G09G 2300/0842; G09G 2310/0289; G09G 2310/0294; G09G 2310/08; G09G 2300/0852; G09G 2300/0861; G09G 2310/0251; G09G 2310/0262; G09G 2320/043; G09G 3/3208; G09G 3/3291; G09G 2320/0233; G09G 3/3225; G09G 3/3275; G09G 2300/043
See application file for complete search history.

(56) References Cited

U.S. PATENT DOCUMENTS

| | | | | |
|---|---|---|---|---|
| 2014/0198085 | A1* | 7/2014 | Park | G09G 3/3241 345/212 |
| 2018/0286307 | A1* | 10/2018 | Kim | G09G 3/3283 |
| 2020/0226978 | A1* | 7/2020 | Lin | H10K 59/1213 |
| 2021/0287614 | A1* | 9/2021 | Xiong | G09G 3/3233 |
| 2022/0230592 | A1* | 7/2022 | Zhao | G09G 3/3258 |
| 2023/0196998 | A1* | 6/2023 | Han | G09G 3/3208 345/212 |
| 2024/0127738 | A1* | 4/2024 | Sun | G09G 3/3233 |
| 2024/0144870 | A1* | 5/2024 | Wang | G09G 3/3233 |

FOREIGN PATENT DOCUMENTS

CN 112133242 A 12/2020

* cited by examiner

*Primary Examiner* — Lunyi Lao
*Assistant Examiner* — Jarurat Suteerawongsa
(74) *Attorney, Agent, or Firm* — KDW FIRM PLLC

(57) ABSTRACT

Provided are a display panel and a display device. The display panel includes a pixel circuit and a light-emitting element. The pixel circuit includes a drive module, a data write module, a compensation module and a reset module. The drive module includes a drive transistor; the data write module is connected to a first electrode of the drive transistor; the compensation module is connected between a gate of the drive transistor and a second electrode of the drive transistor; and the reset module is connected to the gate of the drive transistor or the second electrode of the drive transistor. The working process of the pixel circuit includes a first bias adjustment stage, and the first bias adjustment stage includes a first stage; and in the first stage, the data write module and the reset module are turned off, and the compensation module is turned on.

20 Claims, 18 Drawing Sheets

DISPLAY PANEL AND DISPLAY DEVICE

CROSS-REFERENCE TO RELATED APPLICATION(S)

This application claims priority to Chinese Patent Application No. 202211028570.2 filed Aug. 25, 2022, the disclosure of which is incorporated herein by reference in its entirety.

TECHNICAL FIELD

The present disclosure relates to the field of display technologies and, in particular, to a display panel and a display device.

BACKGROUND

A display panel is generally provided with pixel circuits and light-emitting elements, and drive transistors in the pixel circuits can provide drive currents for the light-emitting elements according to data signals received by the drive transistors to drive the light-emitting elements to emit light, so that the display panel presents a corresponding display image.

However, over time, internal characteristics of the drive transistors in the pixel circuits change slowly, causing the threshold voltage of the drive transistors to drift, and at different display brightness, the threshold drift of the drive transistors is also different, thereby affecting the display uniformity of the display panel.

SUMMARY

The present disclosure provides a display panel and a display apparatus, so as to improve the display abnormality at different display brightness and improve the display uniformity of the display panel.

According to an aspect of the present disclosure, a display panel is provided.

The display panel includes a pixel circuit and a light-emitting element.

The pixel circuit includes a drive module, a data write module, a compensation module and a reset module.

The drive module includes a drive transistor.

The data write module is connected to a first electrode of the drive transistor.

The compensation module is connected between a gate of the drive transistor and a second electrode of the drive transistor.

The reset module is connected to the gate of the drive transistor or the second electrode of the drive transistor.

The working process of the pixel circuit includes a first bias adjustment stage, and the first bias adjustment stage includes a first stage.

In the first stage, the data write module and the reset module are turned off, and the compensation module is turned on.

According to another aspect of the present disclosure, a display device is provided. The display device includes the preceding display panel.

BRIEF DESCRIPTION OF DRAWINGS

To illustrate solutions in embodiments of the present disclosure more clearly, drawings used in the description of the embodiments will be briefly described below. Apparently, the drawings described below illustrate part of embodiments of the present disclosure, and those of ordinary skill in the art may obtain other drawings based on the drawings described below on the premise that no creative work is done.

DETAILED DESCRIPTION

Figure 1:
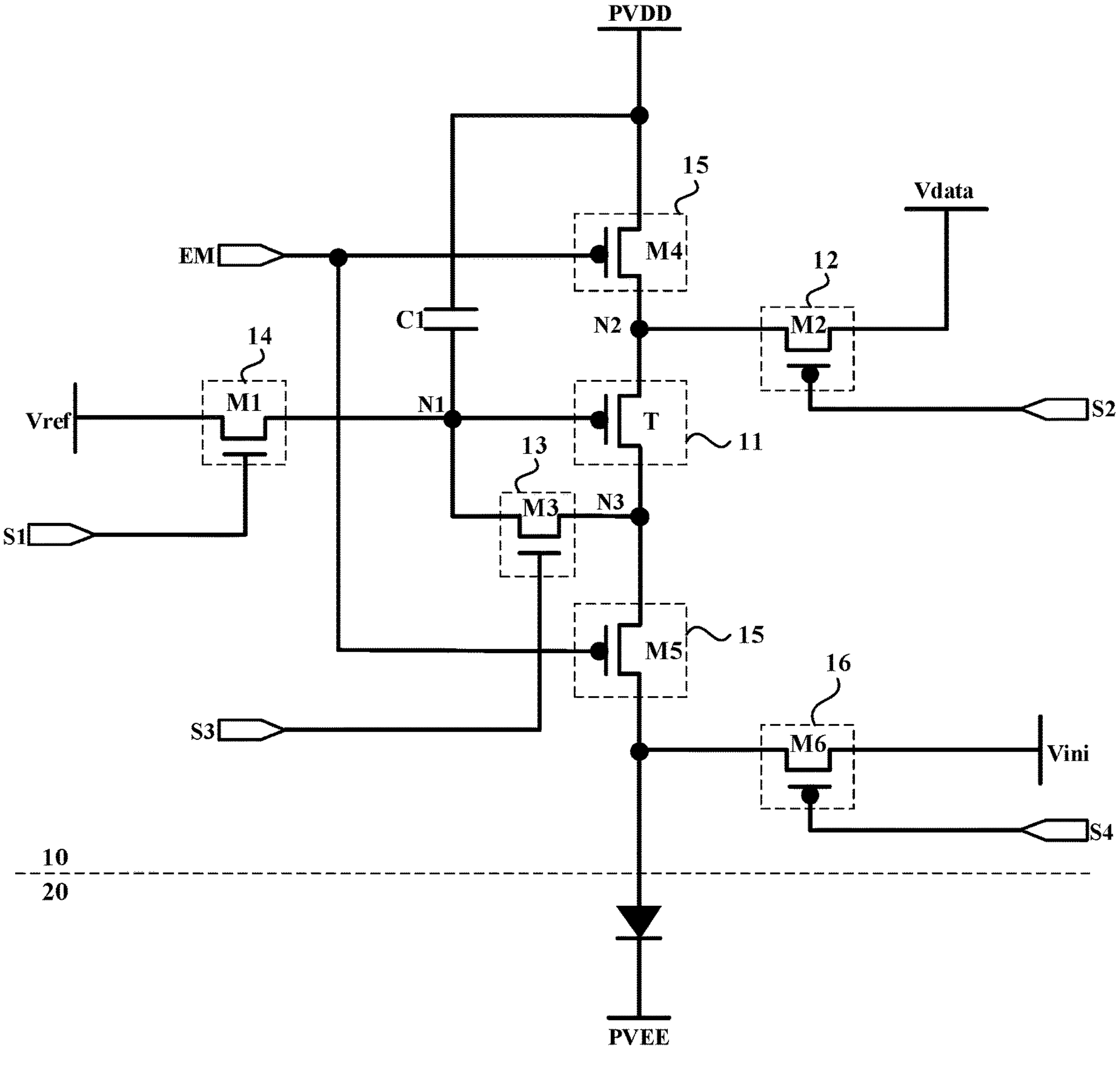
FIG. 1 is a structural diagram of a pixel circuit in a display panel according to an embodiment of the present disclosure.

The technical solutions in embodiments of the present disclosure will be described clearly and completely in conjunction with the drawings in the embodiments of the present disclosure from which the solutions of the present disclosure will be better understood by those skilled in the art. Apparently, the embodiments described below are part, not all, of the embodiments of the present disclosure. Based on the embodiments in the present disclosure, all other embodiments obtained by those of ordinary skill in the art on the premise that no creative work is done are within the scope of the present disclosure.

It is to be noted that the terms "first", "second" and the like in the description, claims and drawings of the present disclosure are used for distinguishing between similar objects and are not necessarily used for describing a particular order or sequence. It is to be understood that the data used in this manner is interchangeable under appropriate circumstances so that the embodiments of the present disclosure described herein may also be implemented in a sequence not illustrated in the drawings or described herein. In addition, the terms "comprising", "including" or any other variations thereof are intended to encompass a non-exclusive inclusion. For example, a process, method, system, product or device that includes a series of steps or units not only includes the expressly listed steps or units but may also include other steps or units that are not expressly listed or are inherent to such a process, method, system, product or device.

A self-luminous display panel includes pixel circuits and light-emitting elements, and a pixel circuit includes drive transistors. A data signal is provided for a gate of a drive transistor so that the drive transistor converts the data signal into a drive current to drive a light-emitting element to emit light. However, when the drive transistor is turned on, for a P-channel Metal Oxide Semiconductor (PMOS) drive transistor, a case may exist where a potential of a gate of the PMOS drive transistor is higher than a potential of a drain of the PMOS drive transistor; and for an N-channel Metal Oxide Semiconductor (NMOS) drive transistor, a case may exist where a potential of a gate of the NMOS drive transistor is lower than a potential of a drain of the NMOS drive transistor. If the drive transistor is kept in these states for a long time, ions inside the drive transistor are polarized, thereby an built-in electric field is formed inside the drive transistor, and a threshold voltage of the drive transistor drifts continuously, so that the drive transistor is biased; as a result, the stability of the drive current provided by the drive transistor is affected, and the light emission stability of the light-emitting element is affected.

In the related art, a fixed bias adjustment signal is provided for the drive transistor to improve the impact caused by the bias of the drive transistor on the display effect of the display panel. However, since data signals provided for gates of drive transistors are different at different gray scales, potentials of the gates of the drive transistors are different, so that potential differences between the gates of the drive transistors and drains of the drive transistors are different, that is, the bias degrees of the drive transistors are different. When the same bias adjustment signal is provided for the drive transistors having different gate-drain potential differences, the recovery speeds and recovery degrees of the drive transistors having different bias degrees are different; therefore, using only a fixed bias adjustment signal cannot solve the problem of different bias of the drive transistors at different gray scales, and thus the display uniformity of the display panel is affected.

To solve the preceding technical problem, in the embodiments of the present disclosure, in a first stage of a first bias adjustment stage, a data write module and a reset module are controlled to be turned off, and only a compensation module is controlled to be turned on, so that a path is formed between a gate of a drive transistor and a second electrode of the drive transistor, and a potential of the gate of the drive transistor is loaded to the second electrode of the drive transistor. In this manner, at different gray scales, potentials of the gate of drive transistor are different, and potentials loaded to the second electrode of the drive transistor are also different, so that at various gray scales, the potentials of the gate of the drive transistor can be kept consistent with the potentials of the second electrode of the drive transistor; therefore, different bias degrees of the drive transistor at different gray scales can be adjusted in a targeted manner.

The preceding is the core idea of the present disclosure. Based on the embodiments of the present disclosure, all other embodiments obtained by those of ordinary skill in the art on the premise that no creative work is done are within the scope of the present disclosure. Technical solutions in the embodiments of the present disclosure are described clearly and completely hereinafter in conjunction with the drawings in the embodiments of the present disclosure.

Figure 2:
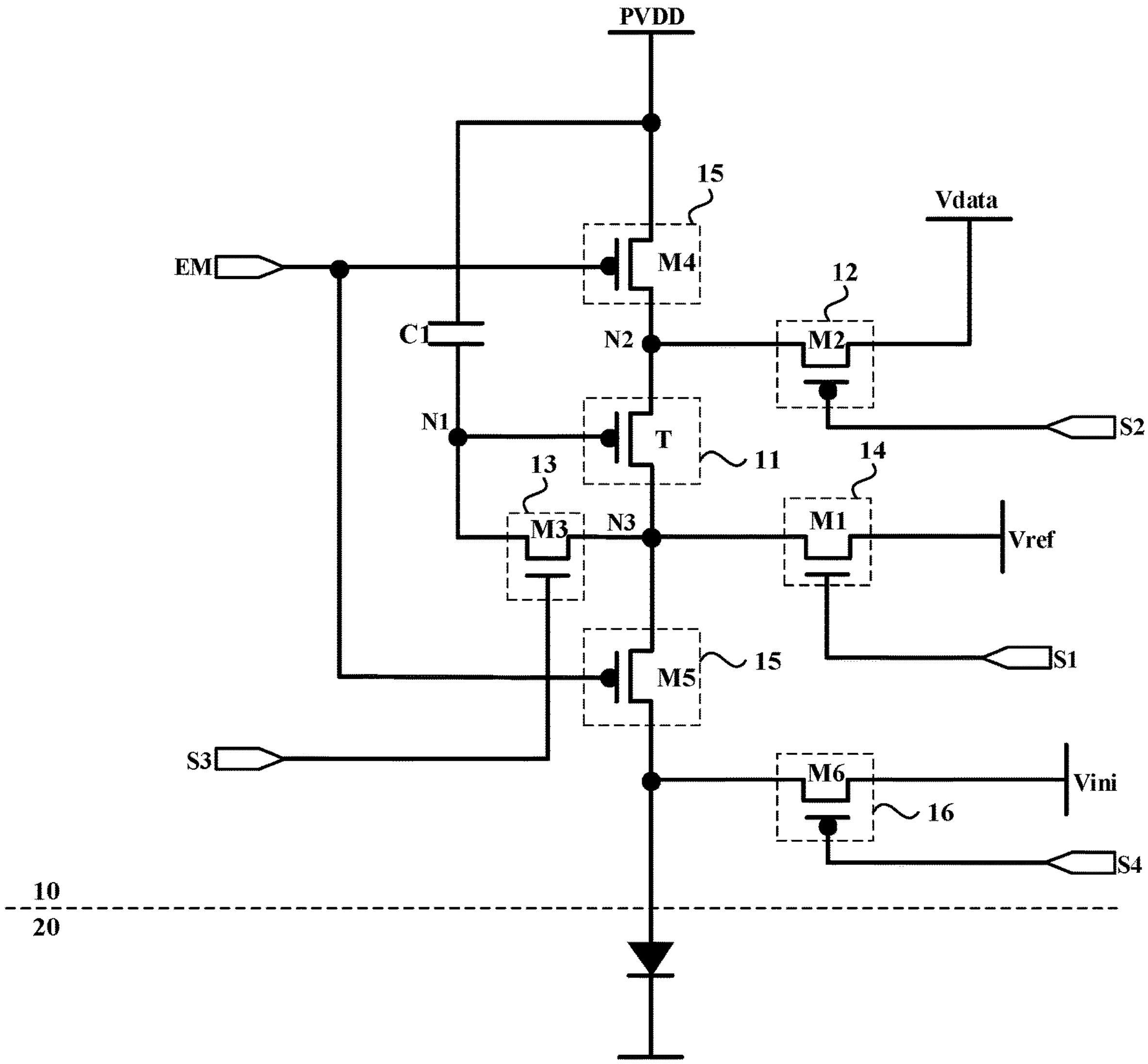
FIG. 2 is a structural diagram of another pixel circuit in a display panel according to an embodiment of the present disclosure.

FIG. 1 is a structural diagram of a pixel circuit in a display panel according to an embodiment of the present disclosure, and FIG. 2 is a structural diagram of another pixel circuit in a display panel according to an embodiment of the present disclosure. As shown in FIG. 1 or FIG. 2, a display panel includes a pixel circuit 10 and a light-emitting element 20. The pixel circuit 10 includes a drive module 11, a data write module 12, a compensation module 13 and a reset module 14. The drive module 11 includes a drive transistor T. The data write module 12 is connected to a first electrode of the drive transistor T. The compensation module 13 is connected between a gate of the drive transistor T and a second electrode of the drive transistor T. The reset module 14 is connected to the gate of the drive transistor T or the second electrode of the drive transistor T. A working process of the pixel circuit 10 includes a first bias adjustment stage, where the first bias adjustment stage includes a first stage. In the first stage, the data write module 12 and the reset module 14 are turned off, and the compensation module 13 is turned on.

In an embodiment, the reset module 14 may control a resetting signal Vref to be written into the gate of the drive transistor T and the second electrode of the drive transistor T to reset the gate of the drive transistor T and/or the second electrode of the drive transistor T, so as to prevent a potential of the gate of the drive transistor T or a potential of the second electrode of the drive transistor T in a last working cycle from affecting the writing of a data signal Vdata in a next working cycle. The data write module 12 may control the data signal Vdata to be written into the gate of the drive transistor T. The compensation module 13 may compensate for a threshold voltage Vth of the drive transistor T so that a drive current provided by the drive transistor T for the light-emitting element 20 can be independent of the threshold voltage of the drive transistor T itself. A time period during which the drive transistor T provides the drive current for the light-emitting element 20 is a light emission stage, a stage during which the data write module 12 writes the data signal Vdata into the gate of the drive transistor T and the compensation module 11 performs threshold voltage compensation on the drive transistor T is a data write stage, and a stage during which the reset module 14 writes the resetting signal into the gate of the drive transistor T is a resetting stage. That is, the working process of the pixel circuit includes at least a resetting stage, a data write stage and a light emission stage. In a drive cycle of the pixel circuit, the resetting stage, the data write stage and the light emission stage are generally performed sequentially, that is, after the drive transistor T is reset in the resetting stage, the data write stage is entered during which the data signal is written into the drive transistor T; after the data write stage is completed, the light emission stage is entered during which the drive transistor T provides the drive current for the light-emitting element 20 to drive the light-emitting element to emit light; and after the light emission stage ends, a next drive cycle is entered. After the pixel circuit 10 passes the light emission stage of the last drive cycle and before the pixel circuit 10 enters the resetting stage of a current drive cycle, a potential of the gate of the drive transistor T carries the data signal of the last working process; and since data signals corresponding to the drive transistor T at different gray scales are different, bias degrees of the drive transistor T at different gray scales are different at the end of the light emission stage.

In an embodiment, if the drive transistor T is a PMOS transistor, the gate of the drive transistor is electrically connected to a first node N1, the first electrode of the drive transistor T is electrically connected to a second node N2 and is coupled to a positive power supply PVDD through the second node N2, the second electrode of the drive transistor T is electrically connected to a third node N3 and is coupled to an anode of the light-emitting element 20 through the third node N3, and a cathode of the light-emitting element 20 is electrically connected to a negative power supply PVEE. In this manner, in the light emission stage, the potential of the second electrode of the drive transistor T is relatively low. Moreover, the higher the display light emission brightness required to be presented by the light-emitting element 20, the higher the gray scale of the display, and the lower a voltage of the corresponding data signal. For example, in a white image, the voltage of the corresponding data signal is relatively low, so that a potential written into the gate of the drive transistor T is relatively low; in the light emission stage, a potential difference between the gate of the drive transistor T and the second electrode of the drive transistor T is relatively small, and at this time, the bias degree of the drive transistor T is relatively low; in a black image, the voltage of the corresponding data signal is relatively high, so that a potential written into the gate of the drive transistor T is relatively high; in the light emission stage, the potential difference between the gate of the drive transistor T and the second electrode of the drive transistor T is relatively large, and at this time, the bias degree of the drive transistor T is relatively high; thus, the bias degrees of the drive transistor T in the black image and in the white image are different, and it is required to perform different degrees of bias adjustment for the respective different bias degrees in the black image and the white image.

In the embodiment, in the first stage of the first bias adjustment stage, the compensation module 13 is controlled to be turned on, and the data write module 12 and the reset module 14 are controlled to be turned off, so that the potential of the gate of the drive transistor T flows to the second electrode of the drive transistor T. For the white image, the potential of the gate of the drive transistor T is relatively low, thus the potential loaded from the gate to the second electrode is also a relatively-low potential, and at this time, the potential difference between the gate of the drive transistor and the second electrode of the drive transistor is still relatively small; for the black image, the potential of the gate of the drive transistor is relatively high, the potential loaded from the gate to the second electrode is also a relatively-high potential, and at this time, the potential difference between the gate of the drive transistor and the second electrode of the drive transistor can also be relatively reduced. Therefore, different degrees of bias adjustment for different gray scales (that is, the black image and the white image) can be achieved, so that at various gray scales, a targeted bias adjustment can be performed on the drive transistor T to improve or eliminate the threshold drift phenomenon caused by a voltage difference between the gate of the drive transistor T and the second electrode of the drive transistor T, the display uniformity of the display panel is improved, and the display effect of the display panel is improved. The first bias adjustment stage may be set after the light emission stage of a last drive cycle of the pixel circuit ends and before the resetting stage of a current drive cycle starts. On the premise of performing different-degree targeted bias adjustment on the drive transistor at different gray scales, the embodiment of the present disclosure does not specifically limit the time period of the first bias adjustment stage in one drive cycle.

Figure 3:
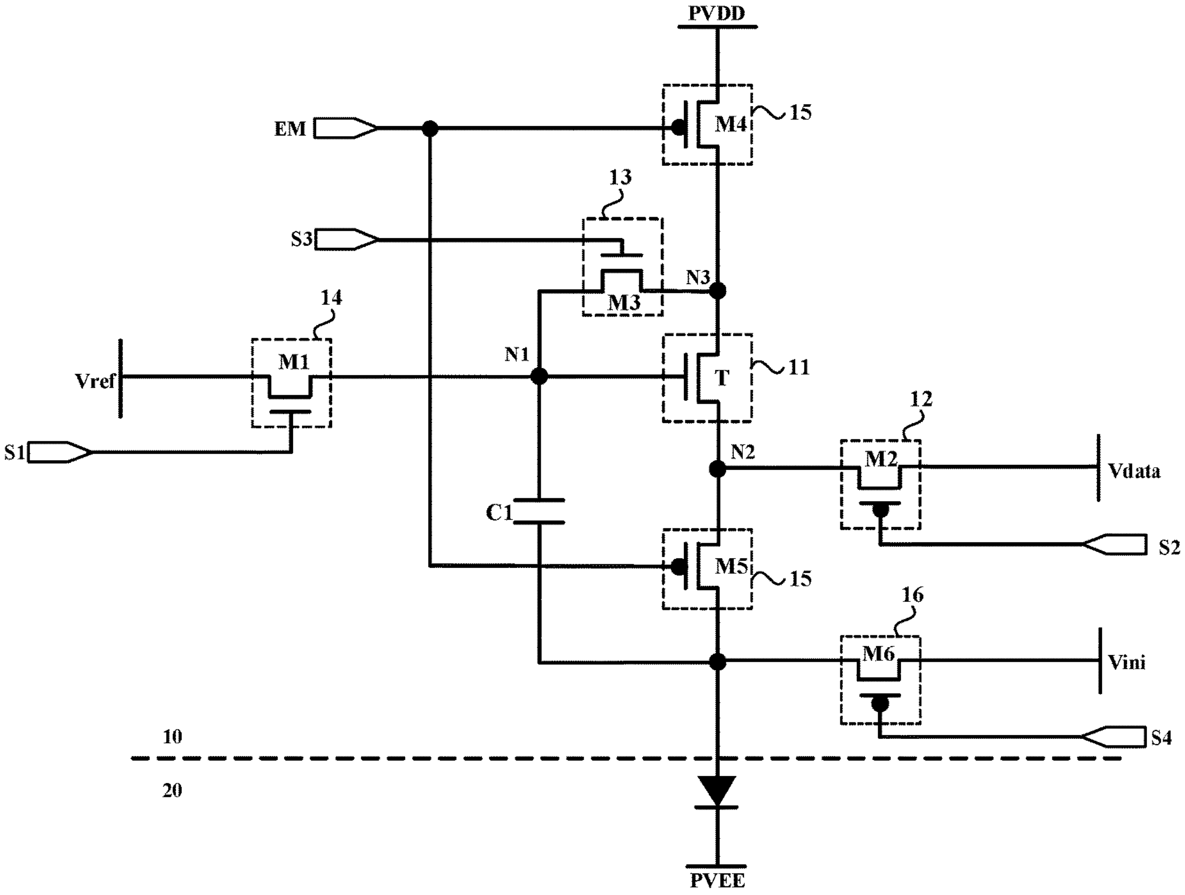
FIG. 3 is a structural diagram of another pixel circuit in a display panel according to an embodiment of the present disclosure.
Figure 4:
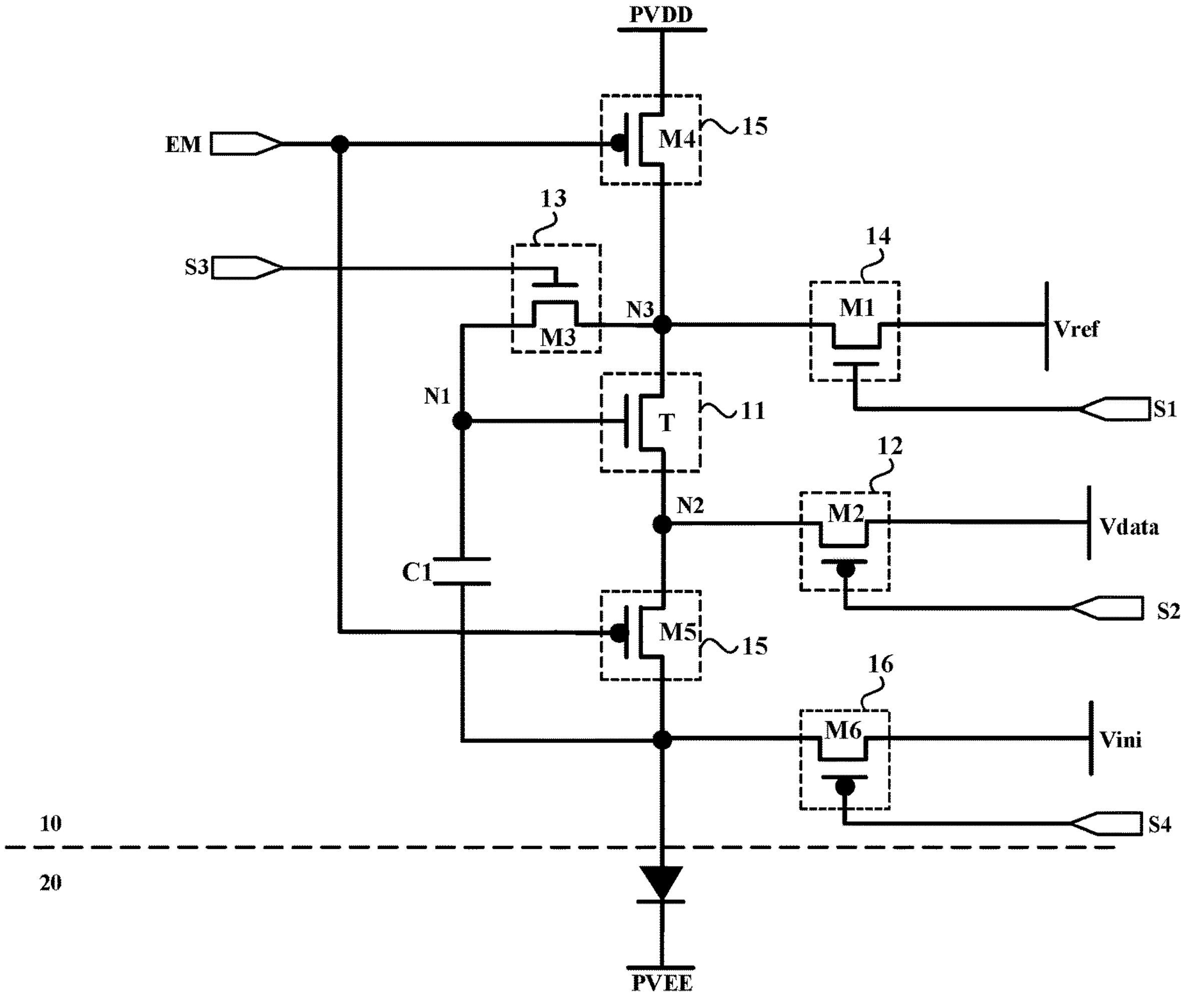
FIG. 4 is a structural diagram of another pixel circuit in a display panel according to an embodiment of the present disclosure.

It is to be understood that FIG. 1 and FIG. 2 both exemplarily show the case where the drive transistor T is a PMOS transistor. In an embodiment of the present disclosure, the drive transistor T may also be an NMOS transistor. As shown in FIG. 3 or FIG. 4, if the drive transistor T is an NMOS transistor, the second electrode of the drive transistor T is coupled to the positive power supply PVDD, the first electrode of the drive transistor T is coupled to the anode of the light-emitting element 20, and the cathode of the light-emitting element 20 is electrically connected to the negative power supply PVEE. At this time, in the light emission stage, the potential of the second electrode of the drive transistor T is relatively high. Moreover, the higher the display light emission brightness required to be presented by the light-emitting element 20, the higher the gray scale of the light-emitting element, and the higher the voltage of the corresponding data signal. For example, in a white image, the voltage of the corresponding data signal is relatively high, so that the potential of the gate of the drive transistor T is relatively high; in the light emission stage, the potential difference between the gate of the drive transistor T and the second electrode of the drive transistor T is still relatively small, and at this time, the bias degree of the drive transistor T is relatively low; in the first stage of the first bias adjustment stage, the compensation module 13 is controlled to be turned on, and the data write module 12 and the reset module 14 are controlled to be turned off, so that the potential of the gate of the drive transistor T flows to the second electrode of the drive transistor T to load a relatively-high potential to the second electrode of the drive transistor T, and thus the potential difference between the gate of the drive transistor T and the second electrode of the drive transistor T still remains relatively small. Similarly, in a black image, the voltage of the corresponding data signal is relatively low, so that the potential of the gate of the drive transistor T is relatively low; in the light emission stage, the potential difference between the gate of the drive transistor T and the second electrode of the drive transistor T is relatively large; in the first stage of the first bias adjustment stage, the compensation module 13 is controlled to be turned off, and the data write module 12 and the reset module 14 are controlled to be turned off, so that the potential of the gate of the drive transistor T flows to the second electrode of the drive transistor T to load a relatively-low potential to the second electrode of the drive transistor T, and thus the potential difference between the gate of the drive transistor and the second electrode of the drive transistor can be relatively reduced. In this manner, different degrees of bias adjustment can also be performed for the black image and the white image so that the drive transistor T can quickly recover to a state tending to be unbiased at different gray scales.

In an example embodiment, referring to any one of FIG. 1 to FIG. 4, the reset module 14 can be turned on or off under the control of a scan signal S1; when the scan signal S1 controls the reset module 14 to be turned on, the reset module 14 can control the resetting signal Vref to be written into the gate of the drive transistor T and/or the second electrode of the drive transistor T, so as to reset the drive transistor T; when the scan signal S1 controls the reset module 14 to be turned off, the writing of the resetting signal Vref can be prevented. At this time, the reset module 14 may include a resetting transistor M1, a gate of the resetting transistor M1 may receive the scan signal S1, a first electrode of the resetting transistor M1 receives the resetting signal Vref, and a second electrode of the resetting transistor M1 is electrically connected to the gate of the drive transistor T or the second electrode of the drive transistor T. The resetting transistor M1 may be an NMOS transistor or a PMOS transistor. If the resetting transistor M1 is an NMOS transistor, when the scan signal S1 is a high level, the resetting transistor M1 is turned on, and when the scan signal S1 is a low level, the resetting transistor M1 is turned off. Conversely, if the resetting transistor M1 is a PMOS transistor, when the scan signal S1 is a low level, the resetting transistor M1 is turned on, and when the scan signal S1 is a high level, the resetting transistor M1 is turned off. The type of the resetting transistor M1 is not specifically limited in the embodiment of the present disclosure.

It is to be noted that in the embodiment of the present disclosure, the reset module 14 may be connected to the gate of the drive transistor T or the second electrode of the drive transistor T. That is, as shown in FIG. 1 and FIG. 3, the reset module 14 is connected to the gate of the drive transistor T, and at this time, the reset module 14 may directly reset the gate of the drive transistor T; in some special cases, the reset module 14 may also indirectly reset the second electrode of the drive transistor T, and at this time, the reset module 14 and the compensation module 13 need to be turned on simultaneously. Alternatively, as shown in FIG. 2 and FIG. 4, the reset module 14 is connected to the second electrode of the drive transistor T, and at this time, the reset module 14 may directly reset the second electrode of the drive transistor T; the reset module 14 may also indirectly reset the gate of the drive transistor T, and at this time, the reset module 14 and the compensation module 13 also need to be turned on simultaneously.

Figure 5:
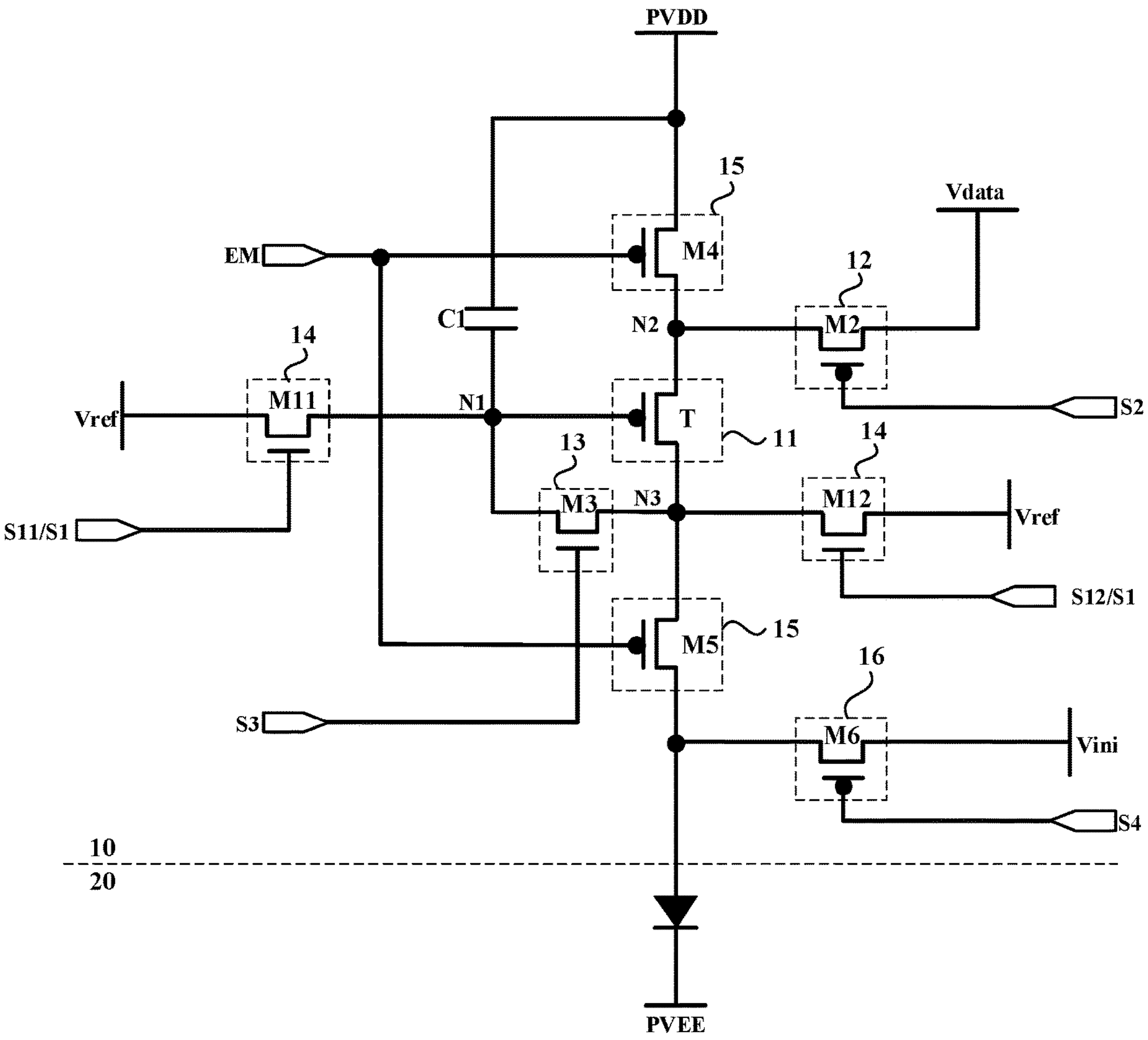
FIG. 5 is a structural diagram of another pixel circuit in a display panel according to an embodiment of the present disclosure.
Figure 6:
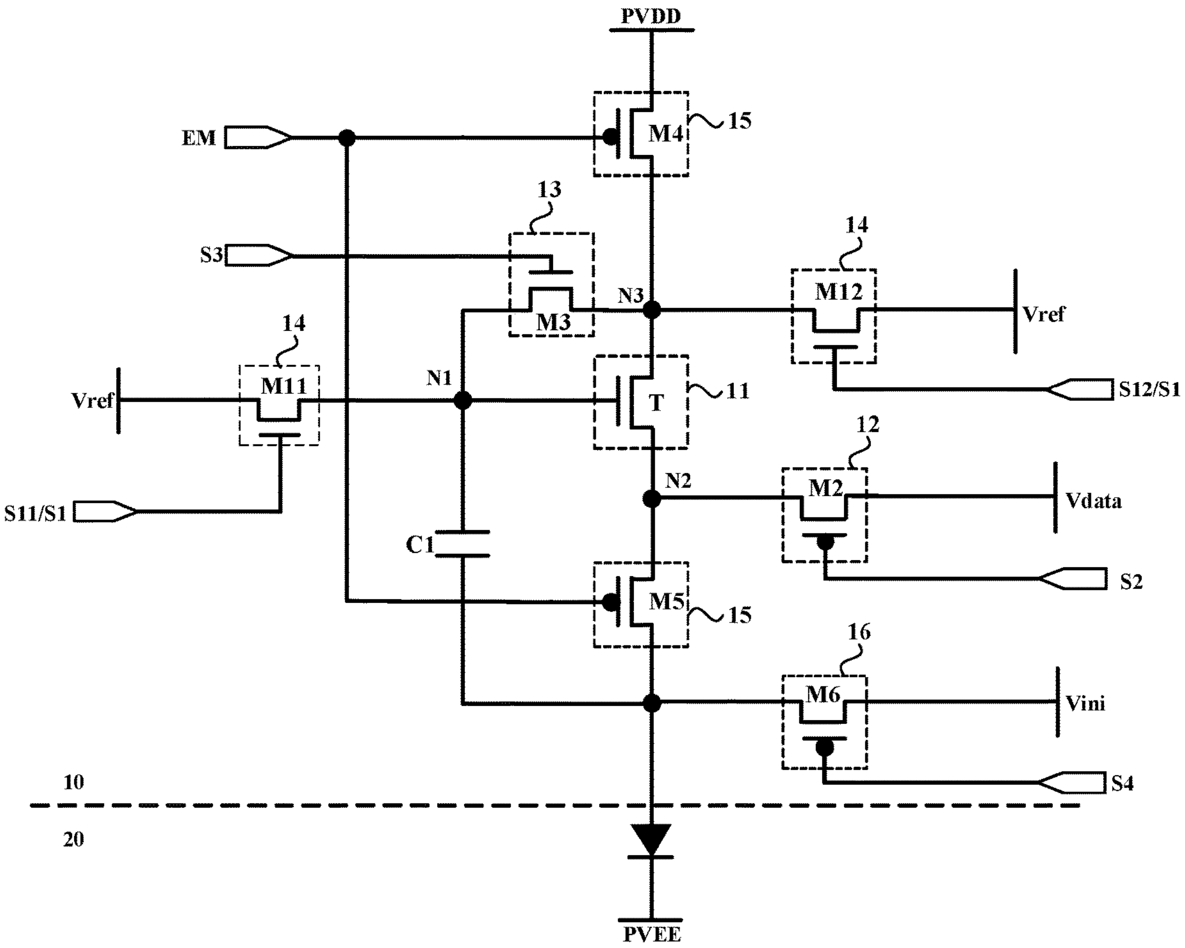
FIG. 6 is a structural diagram of another pixel circuit in a display panel according to an embodiment of the present disclosure.

In other embodiments, as shown in FIG. 5 and FIG. 6, the reset module 14 may also be electrically connected to both the gate of the drive transistor T and the second electrode of the drive transistor T, and at the time, the reset module 14 may include a first resetting transistor M11 and a second resetting transistor M12. A first electrode of the first resetting transistor M11 may receive the resetting signal Vref, and a second electrode of the first resetting transistor M11 may be electrically connected to the gate of the drive transistor T so that the first resetting transistor M11 can directly reset the gate of the drive transistor T. A first electrode of the second resetting transistor M12 may receive the resetting signal Vref, and a second electrode of the second resetting transistor M12 may be electrically connected to the second electrode of the drive transistor T so that the second resetting transistor M12 can directly reset the second electrode of the drive transistor T. When the gate of the drive transistor T and the second electrode of the drive transistor T are reset simultaneously, and the type of the first resetting transistor M11 is the same as the type of the second resetting transistor M12, a gate of the first resetting transistor M11 and a gate of the second resetting transistor M12 may receive the same scan signal S1; when the gate of the drive transistor T and the second electrode of the drive transistor T are set at different times or the type of the first resetting transistor M11 is different from the type of the second resetting transistor M12, the gate of the first resetting transistor M11 and the gate of the second resetting transistor M12 may receive a scan signal S11 and a scan signal S12 respectively, and the times of the scan signal S11 and the scan signal S12 turning on the gate of the first resetting transistor M11 and the second resetting transistor M12 respectively are different. The resetting signal Vref received by the first resetting transistor M11 and the resetting signal Vref received by the second resetting transistor M12 may be the same or different, which is not limited in the embodiment of the present disclosure.

For ease of description, unless otherwise specified, in the embodiments of the present disclosure, a case where the reset module is connected to the gate of the drive transistor T is used as an example for the exemplary description of the technical solutions in the embodiments of the present disclosure.

In an embodiment, with continued reference to any one of FIG. 1 to FIG. 4, the data write module 12 may be turned on or off under the control of a scan signal S2, and the compensation module 13 may be turned on or off under the control of a scan signal S3. When the scan signal S2 controls the data write module 12 to be turned on and the scan signal S3 controls the compensation module 13 to be turned on simultaneously, the data signal Vdata can be written into the gate of the drive transistor T sequentially through the data write module 12, the drive transistor T and the compensation module 13. When the scan signal S2 controls the data write module 12 to be turned off, the writing of the data signal Vdata can be prevented. At this time, the data write module 12 may include a data write transistor M2, a gate of the data write transistor M2 may receive the scan signal S2, a first electrode of the data write transistor M2 receives the data signal Vdata, and a second electrode of the data write transistor M2 is electrically connected to the first electrode of the drive transistor T. The data write module M2 may be an NMOS transistor or a PMOS transistor. If the date write transistor M2 is an NMOS transistor, when the scan signal S2 is a high level, the data write transistor M2 is turned on, and when the scan signal S2 is a low level, the data write transistor M2 is turned off. Conversely, if the data write transistor M2 is a PMOS transistor, when the scan signal S2 is a low level, the data write transistor M2 is turned on, and when the scan signal S2 is a high level, the data write transistor M2 is turned off. The type of the data write transistor M2 is not specifically limited in the embodiment of the present disclosure.

Similarly, the compensation module 13 may include a compensation transistor M3. A gate of the compensation transistor M3 may receive the scan signal S3, a first electrode of the compensation transistor M3 and the second electrode of the drive transistor T are electrically connected to the third node N3, and a second electrode of the compensation transistor M3 and the gate of the drive transistor T are electrically connected to the first node N1. The compensation transistor M3 may be an NMOS transistor or a PMOS transistor. If the compensation transistor M3 is an NMOS transistor, when the scan signal S3 is a high level, the compensation transistor M3 is turned on, and when the scan signal S3 is a low level, the compensation transistor M3 is turned off. Conversely, if the compensation transistor M3 is a PMOS transistor, when the scan signal S3 is a low level, the compensation transistor M3 is turned on, and when the scan signal S3 is a high level, the compensation transistor M3 is turned off. The type of the compensation transistor M3 is not specifically limited in the embodiment of the present disclosure.

In an embodiment, with continued reference to any one of FIG. 1 to FIG. 4, the pixel circuit 10 may further include a light emission control module 15, and the light emission control module 15 may be turned on or off under the control of a light emission control signal EM. The light emission control module 15 is connected in series with the drive transistor T and the light-emitting element 20 between the positive power supply PVDD and the negative power supply PVEE. When the light emission control signal EM controls the light emission control module 15 to be turned on, a current path can be formed between the positive power supply PVDD and the negative power supply PVE, so that the drive transistor T can provide the drive current generated by the drive transistor T for the light-emitting element 20 to drive the light-emitting element 20 to emit light; when the light emission control signal EM controls the light emission control module 15 to be turned off, the drive transistor T cannot provide the drive current for the light-emitting element 20, and the light-emitting element 20 does not emit light.

In an embodiment, the light emission control module 15 may include a first light emission control transistor M4 and a second light emission control transistor M5. A first electrode of the first light emission control transistor M4 is electrically connected to the positive power supply PVDD; a second electrode of the first light emission control transistor M4 and the first electrode of the drive transistor T are electrically connected to the second node N2; the second light emission control transistor M5 and the second electrode of the drive transistor T are electrically connected to the third node N3; and the second light emission control transistor M5 is electrically connected to the anode of the light-emitting element 20. When the first light emission control transistor M4 and the second light emission control transistor M5 are of the same type and are turned on or off simultaneously, a gate of the first light emission control transistor M4 and a gate of the second light emission control transistor M5 may receive the same light emission control signal EM; in some special cases, if the first light emission control transistors M4 and the second light emission control transistor and M5 are of different types or one of the first light emission control transistor M4 and the second light emission control transistor M5 needs to be in a turned-on state during a non-light emission stage of the light-emitting element 20, the gate of the first light emission control transistor M4 and the gate of the second light emission control transistor M5 need to receive different light emission control signals. The case where the first light emission control transistor M4 and the second light emission control transistor M5 are of the same type and are turned on or off simultaneously is taken as an example, and the first light emission control transistor M4 and the second light emission control transistor M5 may both be NMOS transistors or PMOS transistors. When the first light emission control transistor M4 and the second light emission control transistor M5 are both NMOS transistors, when the light emission control signal EM is a high level, the first light emission control transistor M4 and the second light emission control transistor M5 are turned on simultaneously; when the light emission control signal EM is a low level, the first light emission control transistor M4 and the second light emission control transistor M5 are turned off simultaneously. Conversely, when the first light emission control transistor M4 and the second light emission control transistor M5 are both PMOS transistors, when the light emission control signal EM is a low level, the first light emission control transistor M4 and the second light emission control transistor M5 are turned on simultaneously; when the light emission control signal EM is a high level, the first light emission control transistor M4 and the second light emission control transistor M5 are turned off simultaneously. The type of the first light emission control transistor M4 and the type of the second light emission control transistor M5 are not specifically limited in the embodiment of the present disclosure.

In an embodiment, with continued reference to any one FIG. 1 and FIG. 4, the pixel circuit 10 may further include an initialization module 16. The initialization module 16 is connected to the anode of the light-emitting element 20 so as to initialize the anode of the light-emitting element 20 and clear a potential of the anode of the light-emitting element 20 before the light-emitting element 20 emits light, so that the potential of the anode of the light-emitting element 20 in the light emission stage of the last drive cycle is prevented from affecting the display light emission brightness of the light-emitting element 20 in the current drive cycle. The initialization module 16 may be turned on or off under the control of a scan signal S4. When the scan signal S4 controls the initialization module 16 to be turned on, an initialization signal Vini can be written into the anode of the light-emitting element 20 through the initialization module 16 to initialize the anode of the light-emitting element 20. When the scan signal S4 controls the initialization module 16 to be turned off, the initialization module 16 can prevent the writing of the initialization signal Vini. The initialization signal Vini may be the same as or different from the resetting signal Vref, which is not specifically limited in the embodiment of the present disclosure.

In an embodiment, the initialization module 16 may include an initialization transistor M6. A gate of the initialization transistor M6 may receive the scan signal S4, a first electrode of the initialization transistor M6 receives the initialization signal Vini, and a second electrode of the initialization transistor M6 is electrically connected to the anode of the light-emitting element 20. The initialization transistor M6 may be an NMOS transistor or a PMOS transistor. If the initialization transistor M6 is an NMOS transistor, when the scan signal S4 is a high level, the initialization transistor M6 is turned on, and when the scan signal S4 is a low level, the initialization transistor M6 is turned off. Conversely, if the initialization transistor M6 is a PMOS transistor, when the scan signal S4 is a low level, the initialization transistor M6 is turned on, and when the scan signal S4 is a high level, the initialization transistor M6 is turned off. The type of the initialization transistor M6 is not specifically limited in the embodiment of the present disclosure.

In an embodiment, the type of the initialization transistor M6 may be the same as the type of the data write transistor M2. At this time, since the data write transistor M2 controls the writing of the data signal Vdata before the light-emitting element 20 emits light, and the initialization transistor M6 also initializes the anode of the light-emitting element 20 before the light-emitting element 20 emits light, the scan signal S2 received by the gate of the data write transistor M2 may also be used as the scan signal S4 received by the gate of the initialization transistor M6, so that the initialization transistor M6 and the data write transistor M2 can be turned on or off simultaneously.

In addition, the pixel circuit 10 may further include a storage capacitor C1. The storage capacitor C1 is connected between a fixed power supply (for example, the positive power supply PVDD or the negative power supply PVEE) and the gate of the drive transistor T. The storage capacitor C1 is used for storing the potential of the gate (that is, the first node N1) of the drive transistor T, so as to ensure that the drive transistor T can constantly provide the drive current for the light-emitting element 20 during the light emission stage.

For ease of description, the working process of the pixel circuit is exemplarily described by taking a case as an example where the initialization transistor, the data write transistor, the drive transistor, the first light emission control transistor and the second light emission control transistor are all PMOS transistors, and the resetting transistor and the compensation transistor are both NMOS transistors.

Figure 7:
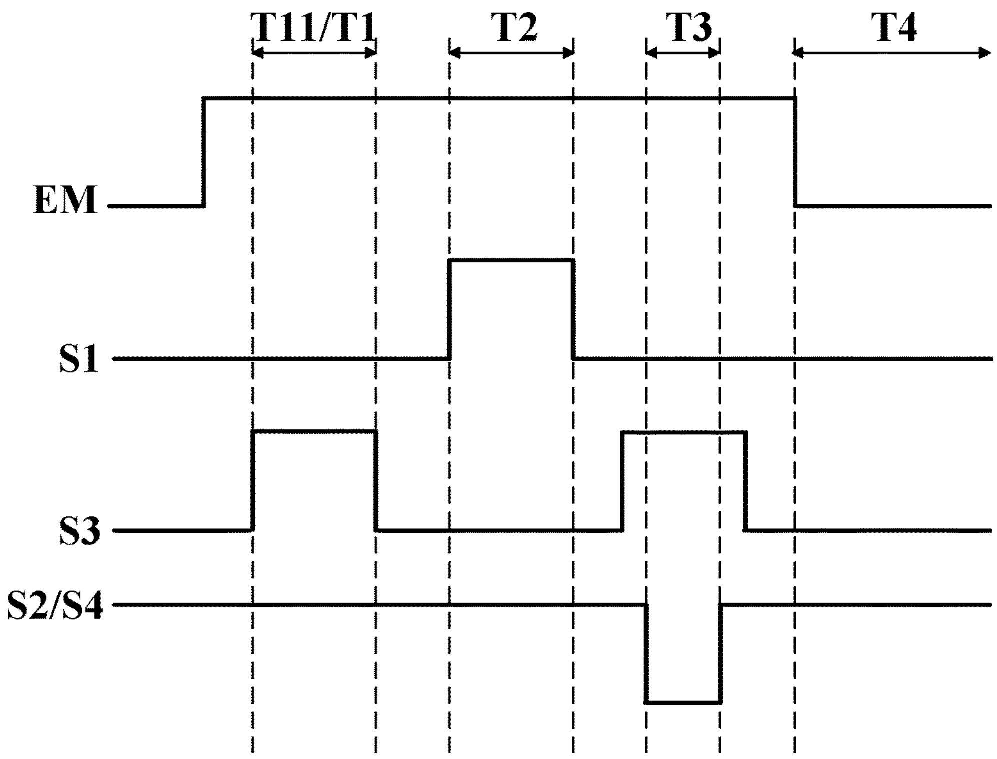
FIG. 7 is a working timing diagram of a pixel circuit in a display panel according to an embodiment of the present disclosure.

In an embodiment, FIG. 7 is a working timing diagram of a pixel circuit in a display panel according to an embodiment of the present disclosure. Referring to FIG. 1 and FIG. 7, a certain voltage difference is kept between the gate of the drive transistor T and the second electrode of the drive transistor T for a long time during the light emission stage of the last drive cycle, so that the drive transistor T is in a biased state for a long time. After the light emission stage of the last drive cycle ends and the current drive cycle starts, the light emission control signal EM jumps from a low level to a high level, the first light emission control transistor M4 and the second light emission control transistor M5 are both turned off, and the light-emitting element 20 does not emit light.

When the first stage T11 of the first bias adjustment stage T1 of the current drive cycle is entered, the scan signal S1 is kept a low level, the resetting transistor M1 is turned off, the resetting signal Vref is not transmitted to the gate of the drive transistor T, and the gate of the drive transistor T still carries the data signal of the last drive cycle; the scan signal S2 is a high level, the data write transistor M2 is turned off, and the data signal Vdata is not transmitted to the first electrode of the drive transistor T, either; the scan signal S3 jumps from a low level to a high level, the compensation transistor M3 is turned on, and the gate of the drive transistor T and the second electrode of the drive transistor T are turned on, that is, the first node N1 and the third node N3 are turned on, so that the potential of the gate of the drive transistor T flows to the second electrode of the drive transistor T, thus the potential of the second electrode of the drive transistor T approaches the potential of the gate of the drive transistor T, the potential difference between the gate of the drive transistor T and the second electrode of the drive transistor T is reduced, then the drive transistor T tends to be an unbiased state in preparation for the subsequent working process. Since the potential of the gate of the drive transistor T carries the data signal Vdata of the last drive cycle when the compensation transistor M3 is turned on, when the potential of the gate of the drive transistor T flows to the second electrode of the drive transistor T, a targeted bias adjustment can be performed according to the data signal provided for the gate of the drive transistor T in the last drive cycle, so that the drive transistor T can quickly recover to a state tending to be unbiased at different gray scales. After the first stage T11 of the first bias adjustment stage T1 ends, the scan signal S3 jumps to a low level, so that the compensation transistor M3 is turned off.

After the resetting stage T2 is entered, the scan signal S1 jumps from a low level to a high level so that the resetting transistor M1 is turned on and the resetting signal Vref is transmitted to the gate of the drive transistor T to reset the gate of the drive transistor T and the storage capacitor C1 and thus clear the data signal written into the gate of the drive transistor T in the last drive cycle; at the same time, after the resetting signal Vref is written, the gate of the drive transistor T is at a relatively-low potential, so that it is ensured that when the data write transistor M2 provides the data signal Vdata for the first electrode of the drive transistor T, the drive transistor T can be in a turned-on state in preparation for the writing of the data signal Vdata. After the resetting stage T2 ends, the scan signal S1 jumps to a low level, and the resetting transistor M1 is turned off.

After the data write stage T3 is entered, the scan signal S3 jumps to a high level again, and the compensation transistor M3 is turned on again; at the same time, the scan signal S2 jumps from a high level to a low level, the data write transistor M2 is turned on and controls the data signal Vdata to be written into the first electrode of the drive transistor T, and then the data signal Vdata is transmitted to the gate of the drive transistor T sequentially through the drive transistor T and the compensation transistor M3; when the voltage difference between the gate of the drive transistor T and the first electrode of the drive transistor T is the threshold voltage Vth of the drive transistor T, the drive transistor T is turned off and the writing of the data signal Vdata is not performed, and at this time, the potential VN1 of the gate of the drive transistor T satisfies that VN1=Vdata+Vth. In this stage, the scan signal S4 may also jump to a low level, so that the initialization transistor M6 is turned on and transmits the initialization signal Vini to the anode of the light-emitting element 20 to initialize the anode of the light-emitting element 20. After the data write stage T3 ends, the scan signal S3 jumps to a low level again, the scan signal S2 and the scan signal S4 both jump to a high level, and the compensation transistor M3, the data write transistor M2 and the initialization transistor M6 are all turned off.

After the light emission stage T4 is entered, the light emission control signal EM jumps from a high level to a low level again, so that the first light emission control transistor M4 and the second light emission control transistor M5 are both turned on; a current path is formed between the positive power supply PVDD and the negative power supply PVEE, the potential of the first electrode of the drive transistor T changes to PVDD due to the turning-on of the first light emission control transistor M4, the potential of the gate of the drive transistor T is Vdata+Vth, and at this time, the drive current Id generated by the drive transistor T satisfies that $Id=K*(Vdata-PVDD)^2$. That is, the drive current generated by the drive transistor T is independent of the threshold voltage of the drive transistor T, so that the threshold voltage of the drive transistor T is prevented from affecting the drive current Id generated by the drive transistor T, and thus the light-emitting element 20 can accurately emit light when the drive current Id is provided for the light-emitting element 20. K is a coefficient related to the size, the material and the like of the drive transistor T It is to be understood that the preceding working process of the pixel circuit is merely an exemplary working process, and on the premise that the targeted bias adjustment can be performed on the drive transistor in the first stage of the first bias adjustment stage, the working process of the pixel circuit is not specifically limited in the embodiment of the present disclosure.

In an embodiment, with continued reference to any one of FIG. 1 to FIG. 4, the first bias adjustment stage further includes a second stage, and the first stage and the second stage are preformed sequentially. In the second stage, the compensation module 13 is turned off and the reset module 14 is turned on.

In an embodiment, when the compensation module 13 is turned off and the reset module 14 is turned on, the resetting signal Vref may be transmitted to the gate of the drive transistor T or the second electrode of the drive transistor T to reset the gate of the drive transistor T or the second electrode of the driving transistor T. In a case where the drive transistor T is a PMOS transistor and the reset module 14 is connected to the gate of the drive transistor T, in the light emission stage, the potential of the gate of the drive transistor T is generally higher than the potential of the second electrode of the drive transistor T, so that the drive transistor T is in a biased state for a long time. In the first stage, the potential of the gate of the drive transistor T carrying data signals corresponding to different images is input into the second electrode of the drive transistor T, so that different degrees of bias adjustment can be performed on the drive transistor T according to the different images, and thus the potential of the second electrode of the drive transistor T tends to be consistent with the potential of the gate of the drive transistor T. After the first stage is performed, the second stage is performed; after the compensation module 13 is turned off and the reset module 14 is turned on, the resetting signal Vref can be written into the gate of the drive transistor T; and since the resetting signal Vref is lower than any data signal Vdata, the gate of the drive transistor can be reset to a relatively-low level after the resetting signal Vref is written; at this time, since the potential of the gate originally carrying the data signal Vdata has been input into the second electrode of the drive transistor T, the potential of the second electrode of the drive transistor T is also a potential carrying the data signal Vdata, and thus the potential of the gate of the drive transistor T is lower than the potential of the second electrode of the drive transistor T, which is opposite to the case where the potential of the gate of the drive transistor T is higher than the potential of the second electrode of the drive transistor T in the light emission stage. In this manner, the bias state of the drive transistor T can be further corrected through the reverse bias on the drive transistor, and the display effect can be further improved.

Figure 8:
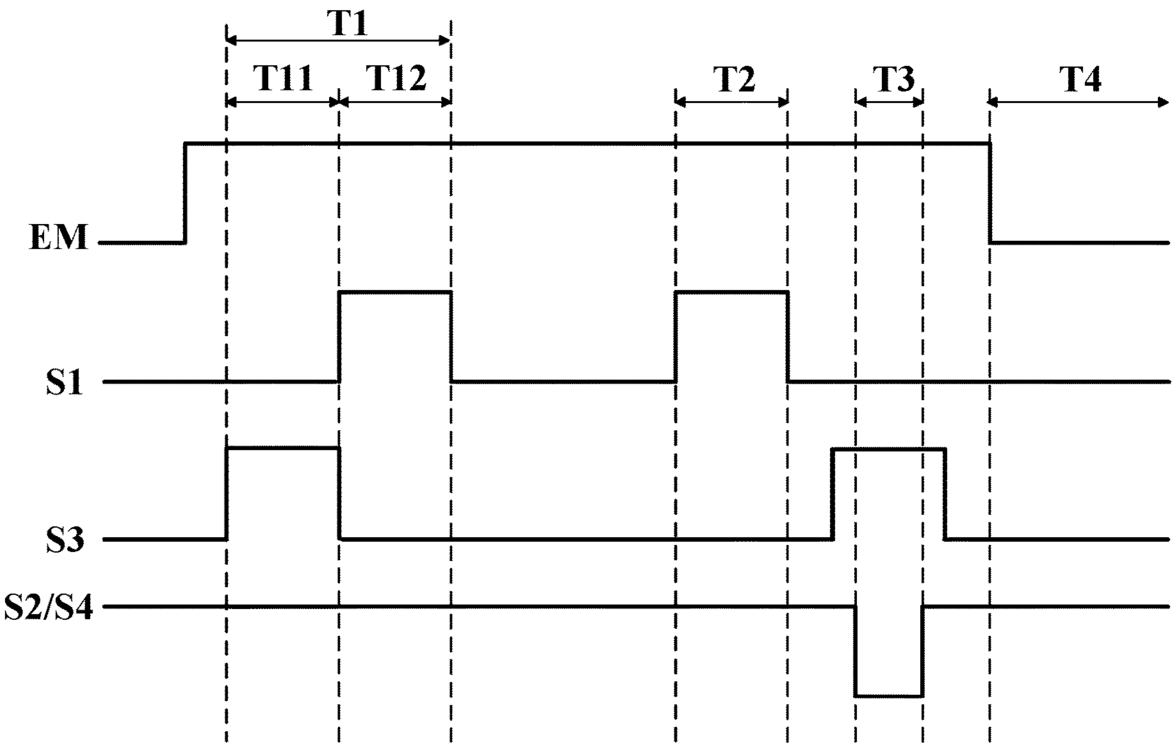
FIG. 8 is a working timing diagram of another pixel circuit in a display panel according to an embodiment of the present disclosure.

In an embodiment, a case is taken as an example where the reset module 14 and the compensation module 13 are both turned on under the control of a high-level scan signal and turned off under the control of a low-level scan signal. FIG. 8 is a working timing diagram of another pixel circuit in a display panel according to an embodiment of the present disclosure. For similarities between FIG. 8 and FIG. 7, reference may be made to the preceding description of FIG. 7, which is not repeated here. Only differences between FIG. 8 and FIG. 7 is exemplarily described here. Referring to FIG. 1 and FIG. 8, after the first stage T11 of the first bias adjustment stage T1, the second stage T12 of the first bias adjustment stage T1 is performed, so that the scan signal S3 jumps to a low level, the scan signal S1 jumps to a high level, thus the compensation module 13 is turned off under the control of the low level of the scan signal S3, and the reset module 14 is turned on under the control of the high level of the scan signal S1; the resetting signal Vref is transmitted to the gate of the drive transistor T through the turned-on reset module 14, so that the gate of the drive transistor T can be at a sufficiently low potential; therefore, the potential of the gate of the drive transistor T is lower than the potential of the second electrode of the drive transistor T, and the bias adjustment on the drive transistor T can be achieved.

It is to be understood that when the signals for controlling various modules to be turned on and turned off are in other cases, the scan signal, the light emission control signal and the resetting signal may be adjusted as appropriate, which is not specifically limited in the embodiment of the present disclosure on the premise that the first stage and the second stage of the first bias adjustment stage can be sequentially performed and the reverse bias of the drive transistor can be controlled in the second stage.

In an embodiment, with continued reference to FIG. 1 to FIG. 8, in the first stage T11 of the first bias adjustment stage T1, only the compensation module 13 is turned on so that the potential of the gate of the drive transistor T flows to the second electrode of the drive transistor T, that is, the potential of the first node N1 flows to the third node N3, and neither the first node N1 nor the second node N3 is connected to other electrical signals; as a result, this process is similar to a charging and discharging process of a capacitor and is relatively slow; if it is desired to enable the potential of the gate of the drive transistor T to be consistent with the potential of the second electrode of the drive transistor T, the first stage T11 of the first bias adjustment stage T1 requires a relatively-long time. In the second stage T12 of the first bias adjustment stage T1, only the reset module 14 is turned on so that the external resetting signal Vref is input into the gate of the drive transistor T; this process is a writing process of the resetting signal Vref at a fixed potential, so that the gate of the drive transistor T can be charged to the resetting signal Vref without an excessive long time.

In addition, the display brightness of the display panel is related to the drive current provided for the light-emitting element and the light emission time duration of the light-emitting element, that is, when the drive current is constant, the longer the light emission time duration of the light-emitting element is in a drive cycle, the more beneficial it is to improve the display brightness of the display panel; and when the drive cycle of the pixel circuit is constant, the longer the light emission time duration of the light-emitting element is, the shorter the non-light emission time duration of the light-emitting element needs to be. In the first bias adjustment stage T1, the light-emitting element 20 does not emit light, that is, the first bias adjustment stage T1 is the non-light emission stage of the light-emitting element 20, so that the time duration of the first bias adjustment stage T1 needs to be shortened as much as possible. Therefore, on the basis of ensuring that a good bias adjustment can be performed on the drive transistor T both in the first stage T11 and in the second stage T12, the time duration of the first stage T11 may be set longer than the time duration of the second stage T12 to shorten the time duration of the first bias adjustment stage T1 as much as possible, so as to ensure that the display panel has sufficient display brightness, which is conducive to improving the display effect of the display panel.

In other embodiments of the present disclosure, the time duration of the first stage may also be shorter than the time duration of the second stage. At this time, in the second stage, the resetting signal can be sufficiently written into the gate of the drive transistor through the turned-on reset module to sufficiently reset the gate of the drive transistor, so that a display mode which poses high requirements on the resetting effect can be applied.

It is to be noted that as shown in FIG. 8, the first bias adjustment stage T1 is a non-light emission stage, so that in a case where the drive cycle of the pixel circuit is constant and when the time duration of the non-light emission stage is relatively long, the time duration of the light emission stage T4 of the drive cycle is relatively shortened; moreover, the display light emission brightness of the display panel is related to the light emission time duration of the display panel; thus when the time duration of the light emission stage T4 is relatively short, the display light emission brightness of the display panel is relatively low, so that the overall display light emission brightness of the display panel is affected. For a display panel working at a relatively-high frequency, the drive cycle of the pixel circuit of the display panel is relatively short, and when the time duration of the non-light emission stage of the display panel is relatively long, the time duration of the light emission stage T4 of the display panel is limited to a relatively-short time duration, thereby seriously affecting the display light emission brightness of the display panel. Therefore, the second stage T12 may be turned on at the end of the first stage T11, that is, the end occasion of the first stage T11 is the same occasion as the start occasion of the second stage T12, so as to shorten the time duration of the first bias adjustment stage T1 as much as possible, that is, shorten the time duration of the non-light emission stage in one drive cycle. Thus, the time duration of the light emission stage T4 can be relatively increased, which is conducive to improving the display brightness of the display panel and improving the display effect of the display panel.

Figure 9:
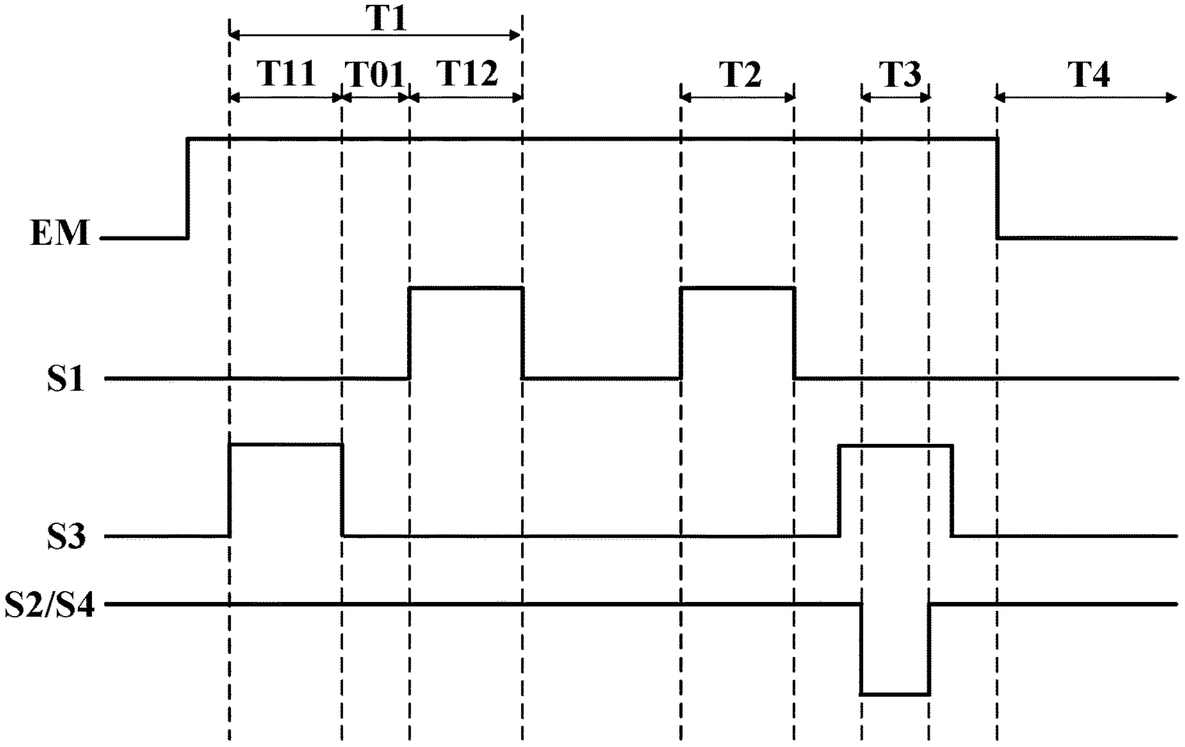
FIG. 9 is a working timing diagram of another pixel circuit in a display panel according to an embodiment of the present disclosure.

In other embodiments of the present disclosure, FIG. 9 is a working timing diagram of another pixel circuit in a display panel according to an embodiment of the present disclosure. Referring to FIG. 1 and FIG. 9, the compensation module 13 is turned on in the first stage T11, the gate of the drive transistor T and the second electrode of the drive transistor T are turned on, and thus the potential of the gate of the drive transistor T is input into the second electrode of the drive transistor T; when the reset module 14 is turned on in the second stage T12, the resetting signal Vref is written into the gate of the drive transistor T, so that the gate of the drive transistor T is at a relatively-low potential. If the turned-on time of the reset module 14 and the turned-on time of the compensation module 13 overlap, the resetting signal Vref is transmitted to the gate of the drive transistor T and simultaneously transmitted to the second electrode of the drive transistor T, so that the potential of the gate of the drive transistor T cannot be lower than the potential of the second electrode of the drive transistor T, and thus reverse bias cannot be performed on the drive transistor T to achieve the bias adjustment on the drive transistor T. Therefore, when the display panel works at a relatively-low frequency and the drive cycle of the pixel circuit is sufficiently long, the time duration of the non-light emission stage in one drive cycle may be appropriately extended, so that the time duration of the first bias adjustment stage T1 in the non-light emission stage can be relatively increased. At this time, a first interval stage T01 may be set between the first stage T11 and the second stage T12, so that the second stage T12 will not be entered immediately after the first stage T11 ends, but will be entered after the first interval stage T01; in this manner, it is ensured that the reset module 14 and the compensation module 13 are not turned on simultaneously, and reverse bias can be performed on the drive transistor T to achieve the bias adjustment on the drive transistor T.

In an embodiment, with continued reference to FIG. 1 and FIG. 9, the time duration of the first interval stage T01 is shorter than the time duration of the first stage T11; and/or, the time duration of the first interval stage T01 is shorter than the time duration of the second stage T12.

In an embodiment, since the first interval stage T01 is set for separating the first stage T11 and the second stage T12, the process of the first interval stage T01 does not require a relatively-long time as long as during which the compensation module 13 can be completely turned off. However, the first stage T11 is a process of balancing the potential of the gate of the drive transistor T and the potential of the second electrode of the drive transistor T, so that the process of the first stage T11 requires a certain time duration to enable the potential of the gate of the drive transistor T to be consistent with the potential of the second electrode of the drive transistor T. Thus, the time duration of the first interval stage T01 may be shorter than the total time duration of the first stage T11, so as to minimize the time duration of the first bias adjustment stage T1. Similarly, the second stage T12 is a process of writing the resetting signal Vref into the gate of the drive transistor T and thus requires a certain time duration for the gate of the drive transistor T to be charged to the resetting signal Vref. Therefore, the time duration of the first interval stage T01 may also be shorter than the time duration of the second stage T12 so that the total time duration of the first bias adjustment stage T1 can be shortened as much as possible on the premise that a good bias adjustment on the drive transistor T is ensured, and thereby the display effect of the display panel is improved.

Figure 10:
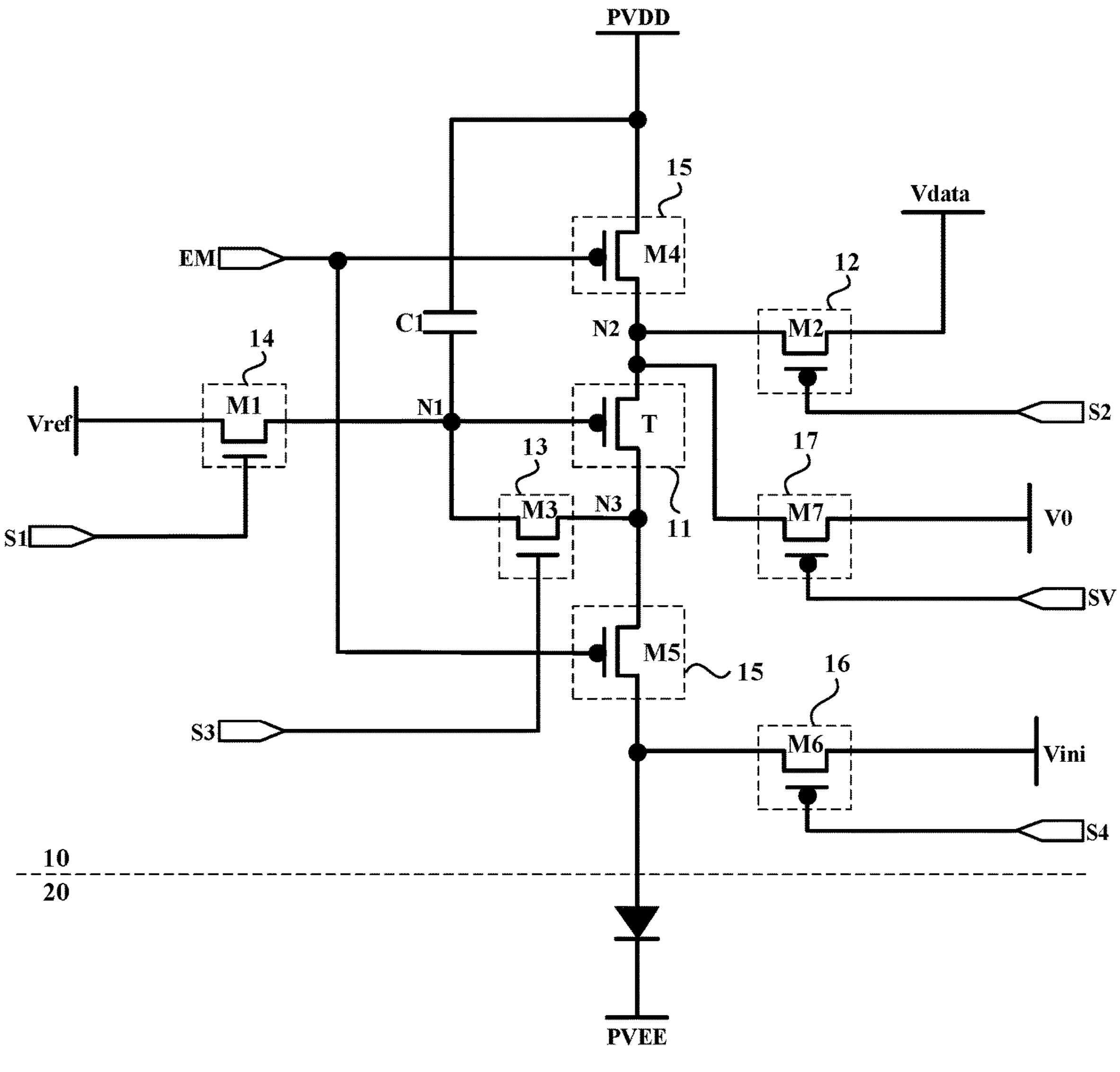
FIG. 10 is a structural diagram of another pixel circuit in a display panel according to an embodiment of the present disclosure.
Figure 11:
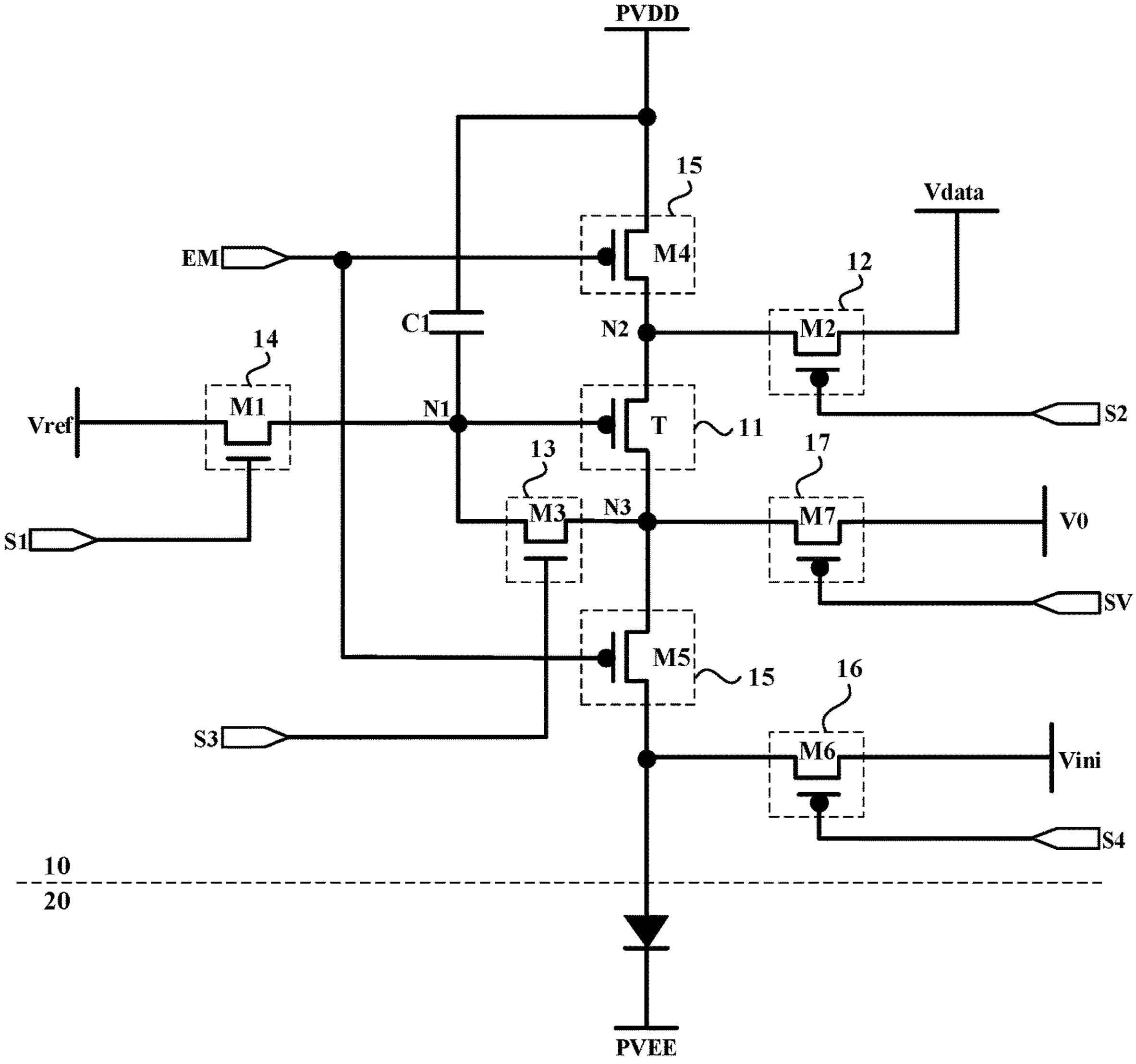
FIG. 11 is a structural diagram of another pixel circuit in a display panel according to an embodiment of the present disclosure.

In an embodiment, based on the preceding embodiments, referring to FIG. 10 or FIG. 11, the pixel circuit 10 further includes a bias adjustment module 17. The bias adjustment module 17 is connected to the first electrode of the drive transistor T or the second electrode of the drive transistor T, and in the first stage, the bias adjustment module 17 is turned off.

In an embodiment, the bias adjustment module 17 may provide a bias adjustment signal V0 for the drive transistor T to perform the bias adjustment on the drive transistor T. In the first stage of the first bias adjustment stage, the compensation module 13 is turned on, and the potential of the gate of the drive transistor T is input into the second electrode of the drive transistor T to balance the potential of the gate of the drive transistor T and the potential of the second electrode of the drive transistor T and perform the targeted bias adjustment on the drive transistor T. At this time, the bias adjustment module 17 does not need to provide the bias adjustment signal for the first electrode of the drive transistor T or the second electrode of the drive transistor T, so that in the first stage, the bias adjustment module 17 is turned off, only ensuring that the compensation module 13 is turned on.

In the first stage of the first bias adjustment stage, the compensation module 13 is turned on and the bias adjustment can be performed on the drive transistor T in a targeted manner; however, limited by the potential of the gate of the drive transistor T, the bias adjustment is performed only depending on the potential of the gate of the drive transistor T flowing to the second electrode of the drive transistor T, and thus relatively-high bias adjustment requirements cannot be satisfied. At this time, the bias adjustment module 17 may be controlled to be turned on before or after the first stage of the first bias adjustment stage, and the bias adjustment signal is provided for the first electrode of the drive transistor T or the second electrode of the drive transistor T to perform the bias adjustment on the drive transistor T. In this manner, the situation is improved where the bias adjustment is insufficient due to only depending on the potential of the gate of the drive transistor T flowing to the second electrode of the drive transistor T, the display uniformity of the display panel is improved, and the display effect of the display panel is further improved.

In an embodiment, the bias adjustment module 17 may be turned on or off under the control of a scan signal SV. When the scan signal SV controls the bias adjustment module 17 to be turned on, the bias adjustment module 17 may directly write the bias adjustment signal V0 into the first electrode of the drive transistor T or the second electrode of the drive transistor T; and in some special cases, the bias adjustment module 17 may also indirectly write the bias adjustment signal V0 into the gate of the drive transistor T, and at this time, the bias adjustment module 17 and the compensation module 13 need to be turned on simultaneously. The bias adjustment module 17 may include a bias adjustment transistor M7. A gate of the bias adjustment transistor M7 may receive the scan signal SV, a first electrode of the bias adjustment transistor M7 receives the bias adjustment signal V0, and a second electrode of the bias adjustment transistor M7 is electrically connected to the first electrode of the drive transistor T or the second electrode of the drive transistor T. In the embodiment of the present disclosure, the bias adjustment transistor M7 may be an NMOS transistor or a PMOS transistor. If the bias adjustment transistor M7 is an NMOS transistor, when the scan signal SV is a high-level signal, the bias adjustment transistor M7 is turned on, and when the scan signal SV is a low-level signal, the bias adjustment transistor M7 is turned off. Conversely, if the bias adjustment transistor M7 is a PMOS transistor, when the scan signal SV is a low-level signal, the bias adjustment transistor M7 is turned on, and when the scan signal SV is a high-level signal, the bias adjustment transistor M7 is turned off. The type of the bias adjustment transistor M7 is not specifically limited in the embodiment of the present disclosure.

Figure 12:
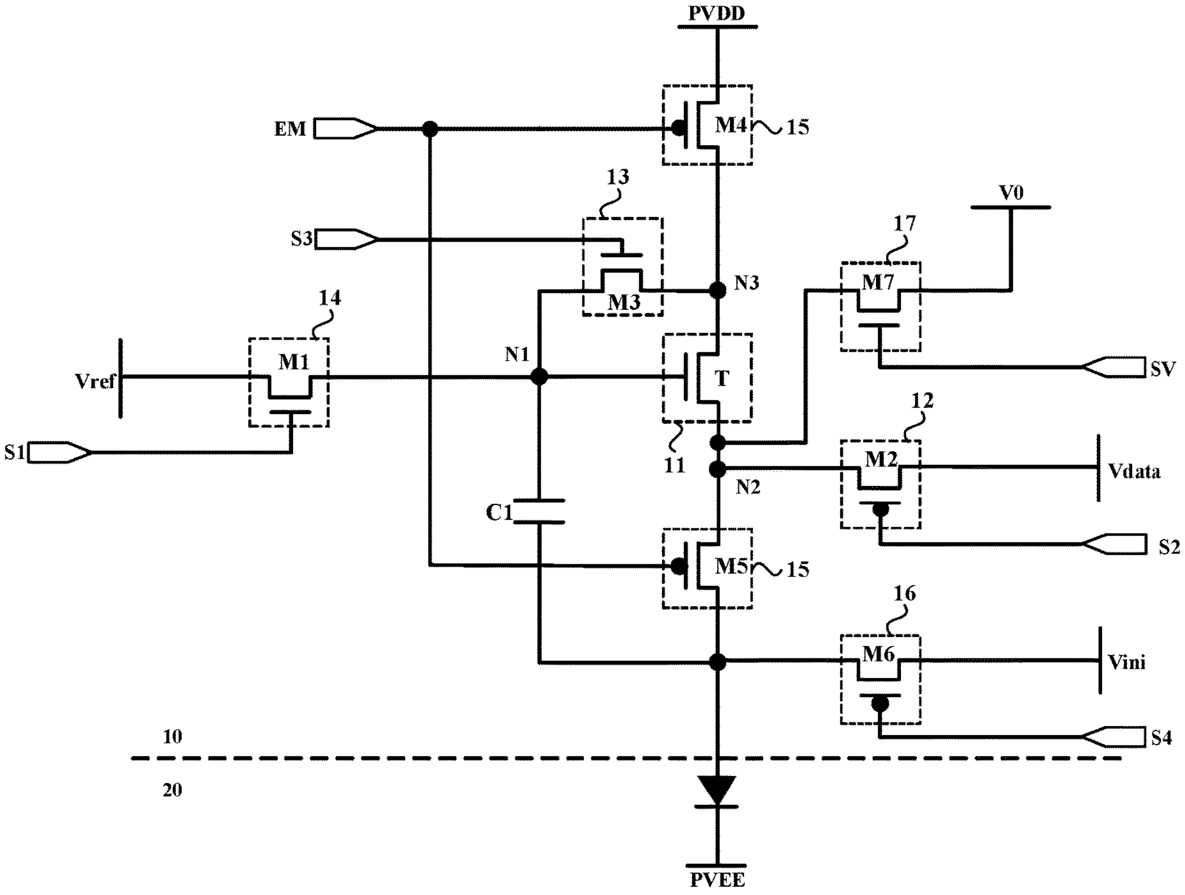
FIG. 12 is a structural diagram of another pixel circuit in a display panel according to an embodiment of the present disclosure.
Figure 13:
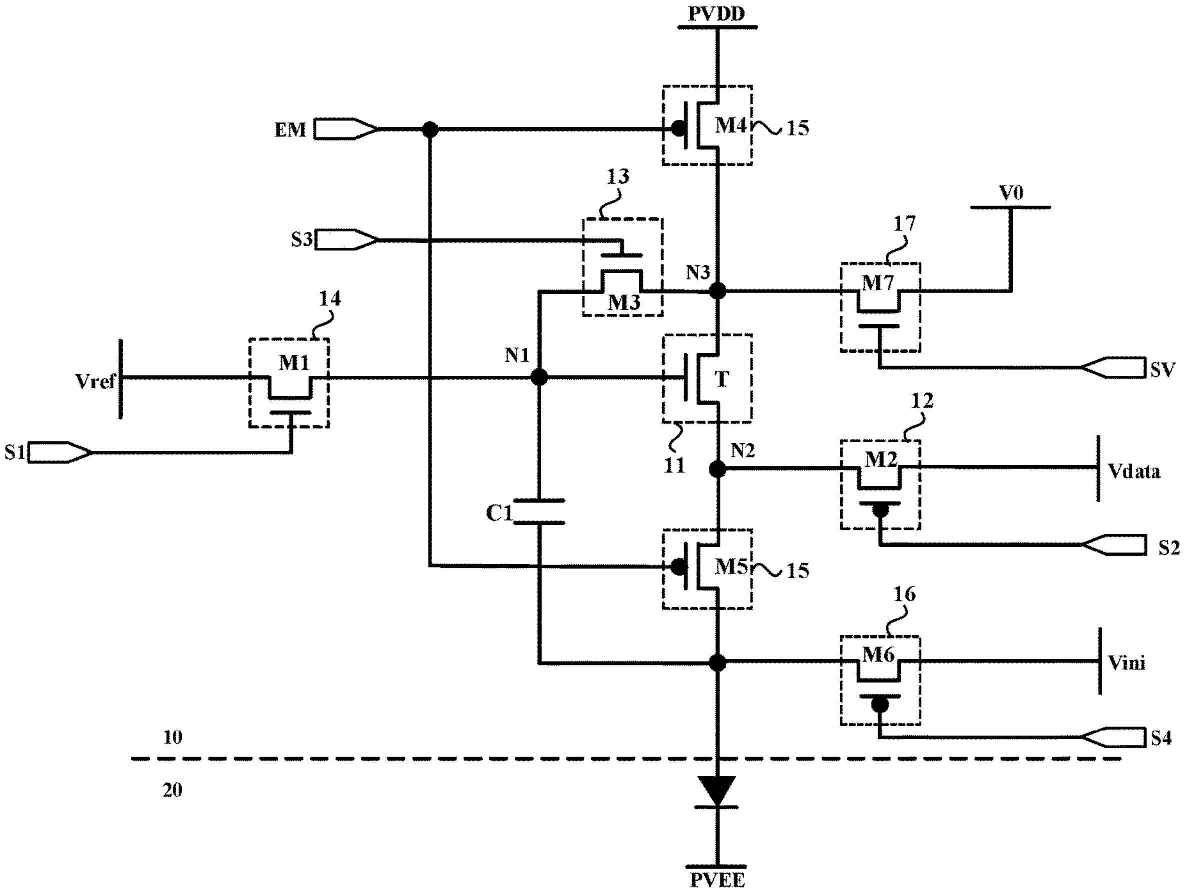
FIG. 13 is a structural diagram of another pixel circuit in a display panel according to an embodiment of the present disclosure.

It is to be noted that FIG. 10 and FIG. 11 only exemplarily show the case where the drive transistor T is a PMOS transistor. At this time, when the bias adjustment module 17 is connected to the first electrode of the drive transistor T, both the bias adjustment module 17 and the first electrode of the drive transistor T are coupled to the positive power supply PVDD; when the bias adjustment module 17 is connected to the first electrode of the drive transistor T, both the bias adjustment module 17 and the first electrode of the drive transistor T are coupled to the anode of the light-emitting element 20. In other embodiments of the present disclosure, as shown in FIG. 12 or FIG. 13, the drive transistor T may also be an NMOS transistor. At this time, when the bias adjustment module 17 is connected to the first electrode of the drive transistor T, both the bias adjustment module 17 and the first electrode of the drive transistor T are coupled to the anode of the light-emitting element 20; when the bias adjustment module 17 is connected to the first electrode of the drive transistor T, both the bias adjustment module 17 and the first electrode of the drive transistor T are coupled to the positive power supply PVDD. The type of the drive transistor T is not specifically limited in the embodiment of the present disclosure. For ease of description, the working process of the pixel circuit is exemplarily described by taking the case as an example where the drive transistor T is a PMOS transistor.

Figure 14:
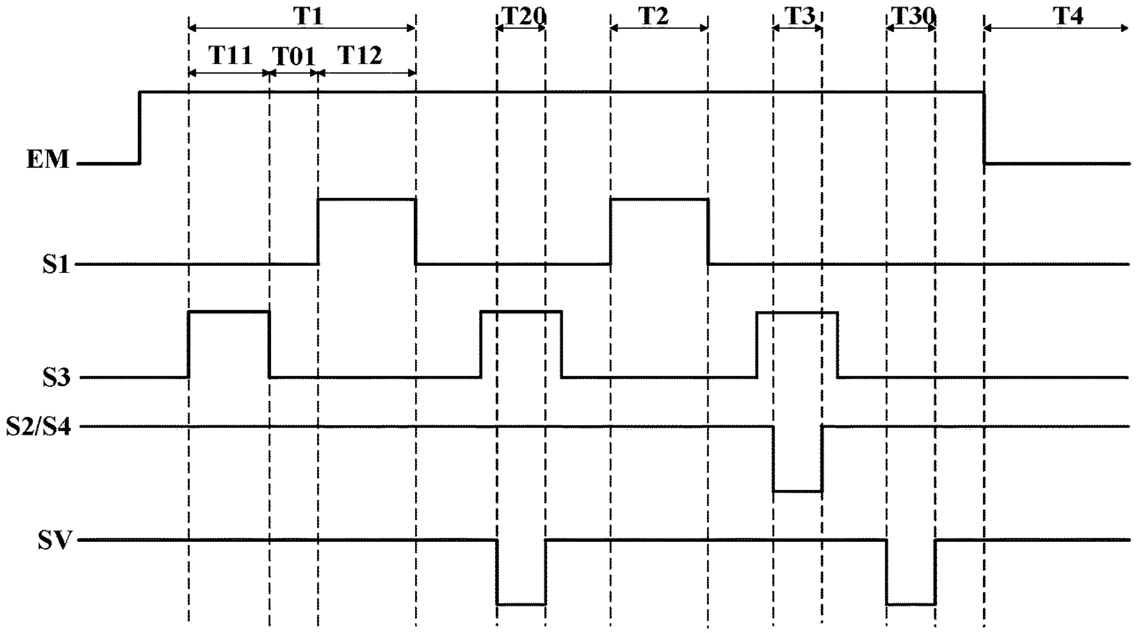
FIG. 14 is a working timing diagram of another pixel circuit in a display panel according to an embodiment of the present disclosure.

In an embodiment, a case is taken as an example where the bias adjustment module 17 is turned on under the control of the low-level scan signal SV and turned off under the control of the high-level scan signal SV. FIG. 14 is a working timing diagram of another pixel circuit in a display panel according to an embodiment of the present disclosure. For similarities between FIG. 14 and FIG. 7, reference may be made to the preceding description of FIG. 7, which is not repeated here. Only differences between FIG. 14 and FIG. 7 will be exemplarily described here. Referring to FIG. 10 and FIG. 14, since the bias adjustment signal V0 is usually at a relatively-high level, for example, at 5V, and the data signal Vdata written into the gate of the drive transistor T is usually at a relatively-low level, for example, the data signal Vdata written into the gate of the drive transistor T in a black image is 3V, the bias adjustment signal V0 cannot be directly written into the gate of the drive transistor T. Therefore, the working process of the pixel circuit 10 may further include a second bias adjustment stage T20 set in the time period between the end of the first bias adjustment stage T1 and the start of the resetting stage T2. In the second bias adjustment stage T20, the bias adjustment module 17 and the compensation module 13 may be controlled to be turned on simultaneously so that the bias adjustment signal V0 can be sequentially transmitted to the first electrode of the drive transistor T, the second electrode of the drive transistor T and the gate of the drive transistor T, and thus the potential of the first electrode of the drive transistor T, the potential of the second electrode of the drive transistor T and the potential of the gate of the drive transistor T tend to be consistent. In this manner, the threshold drift phenomenon of the drive transistor T due to the potential difference between the gate of the drive transistor T and the first electrode of the drive transistor T or the second electrode of the drive transistor T is improved or eliminated. Thus, in the first bias adjustment stage T1, the compensation module 13 is turned on to balance the potential difference between the gate of the drive transistor T and the second electrode of the drive transistor T in different images, so as to achieve a preliminary bias adjustment on the drive transistor T; then, in the second bias adjustment stage T20, the bias adjustment signal V0 at a relatively-high level is used for further performing a bias adjustment on the drive transistor T to ensure that a sufficient bias adjustment is performed on the drive transistor T, so that the phenomenon is eliminated or improved that the light emission accuracy of the light-emitting element 20 driven by the drive transistor T is affected by a long-term voltage difference between the gate of the drive transistor T and the first electrode of the drive transistor T or the second electrode of the drive transistor T, and the display effect of the display panel is improved.

In addition, with continued reference to FIG. 10 and FIG. 14, in the data write stage T3, different data signals are provided for the drive transistor T of the pixel circuit 10 according to the display image of the display panel; and the data signal Vdata is not directly written into the gate of the drive transistor T, but written into the first electrode of the drive transistor T through the data write module 12, transmitted to the second electrode of the drive transistor T through the drive transistor T, and then written into the gate of the drive transistor T through the compensation module 13. Therefore, at the end of the data write stage, both the first electrode of the drive transistor T and the second electrode of the drive transistor T carry the data signal Vdata written into the data write stage T3, and the data signal Vdata is different for different gray scales, so that at the end of the data write stage, the potential of the first electrode of the drive transistor T and the potential of the second electrode of the drive transistor T are different, which will affect the drive current generated in the light emission stage T4. At this time, the working process of the pixel circuit 10 may further include a third bias adjustment stage T30 set in the time period between the end of the data write stage T3 and the start of the light emission stage T4. In the third bias adjustment stage T30, the bias adjustment module 17 is turned on, and the data write module 12, the compensation module 13 and the reset module 14 are all turned off, so that the bias adjustment signal V0 can be transmitted to the first electrode of the drive transistor T and/or the second electrode of the drive transistor T through the bias adjustment module 17, and thus the first electrode of the drive transistor T and/or the second electrode of the drive transistor T are changed from the data signal Vdata to the bias adjustment signal V0. In this manner, the situation is eliminated or improved where the drive current generated in the light emission stage T4 is affected by different potentials of the first electrode of the drive transistor T and the second electrode of the drive transistor T due to different data signals written at different gray scales.

It is to be noted that FIG. 14 merely shows an exemplary working process of a pixel circuit according to an embodiment of the present disclosure. In the embodiment of the present disclosure, on the premise that the targeted bias adjustment can be performed on the drive transistor T, the second bias adjustment stage T20 and/or the third bias adjustment stage T30 may be optionally set, which is not limited in the embodiment of the present disclosure.

In an embodiment, referring to any one of FIG. 10 to FIG. 13, the first bias adjustment stage further includes a third stage, the third stage and the first stage are performed sequentially, or the first stage and the third stage are performed sequentially. In the third stage, the bias adjustment module 17 is turned on, and the compensation module 13 is turned off.

Figure 15:
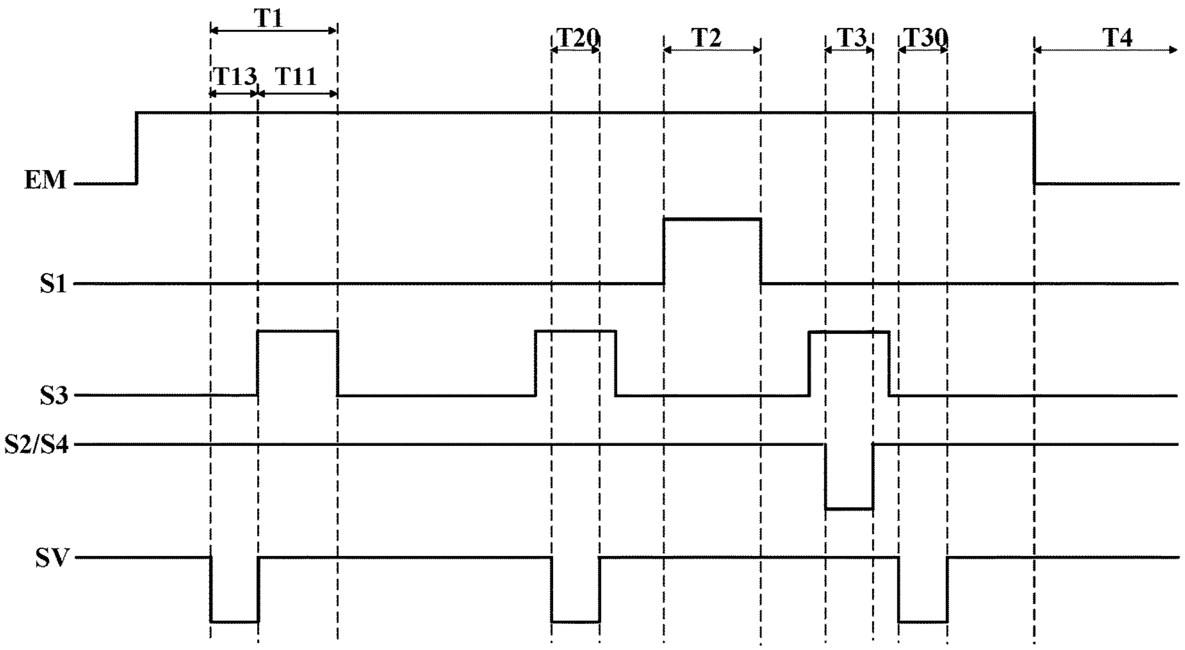
FIG. 15 is a working timing diagram of another pixel circuit in a display panel according to an embodiment of the present disclosure.

In an embodiment, the pixel circuit shown in FIG. 10 is taken as an example. FIG. 15 is a working timing diagram of another pixel circuit in a display panel according to an embodiment of the present disclosure. Referring to FIG. 10 and FIG. 15, in the first stage T11, the potential of the gate of the drive transistor T is input into the second electrode of the drive transistor T to balance the potential difference between the gate of the drive transistor T and the second electrode of the drive transistor T; however, since the potential of the gate of the drive transistor T is limited, the bias adjustment can be performed on the drive transistor T only within a limited range. At this time, before the potential of gate of the drive transistor T is controlled to be input into the second electrode of the drive transistor T, that is, before the first stage T11, the third stage T13 may be performed so that the compensation module 13 is turned off, the bias adjustment module 17 is turned on, and the bias adjustment signal V0 is sequentially input into the first electrode of the drive transistor T and the second electrode of the drive transistor T through the turned-on bias adjustment module 17, and thus the second electrode of the drive transistor T carries the bias adjustment signal V0. After the third stage T13 ends and the first stage T11 is entered, the compensation module 13 is turned on, the bias adjustment module 17 is turned off, and the potential of the gate of the drive transistor flows to the second electrode of the drive transistor T, so that the second electrode of the drive transistor T carries the bias adjustment signal V0 and also carries the data signal Vdata related to the gray scale. In this manner, different degrees of bias adjustment can be performed on the drive transistor T at different gray scales, and the drive transistor T can satisfy higher bias adjustment requirements, which are conducive to improving the display effect of the display panel.

In an embodiment, with continued reference to FIG. 10 and FIG. 15, the first bias adjustment stage T1 is a non-light emission stage, so that in a case where the drive cycle of the pixel circuit is constant and the time duration of the non-light emission stage is relatively long, the time duration of the light emission stage T4 of the drive cycle is relatively shortened, thereby affecting the overall display light emission brightness of the display panel. In addition, for a display panel working at a relatively-high frequency, the drive cycle of the pixel circuit 10 of the display panel is relatively short; to ensure that the display panel has sufficient display brightness, the time duration of the non-light emission stage in one drive cycle may be shortened as much as possible; at this time, the first stage T11 may be turned on at the end of the third stage T13, that is, the end occasion of the third stage T13 is the same occasion as the start occasion of the first stage T11, so that the time duration of the light emission stage T4 is relative increased, which is conducive to improving the display brightness of the display panel and improving the display effect of the display panel.

Figure 16:
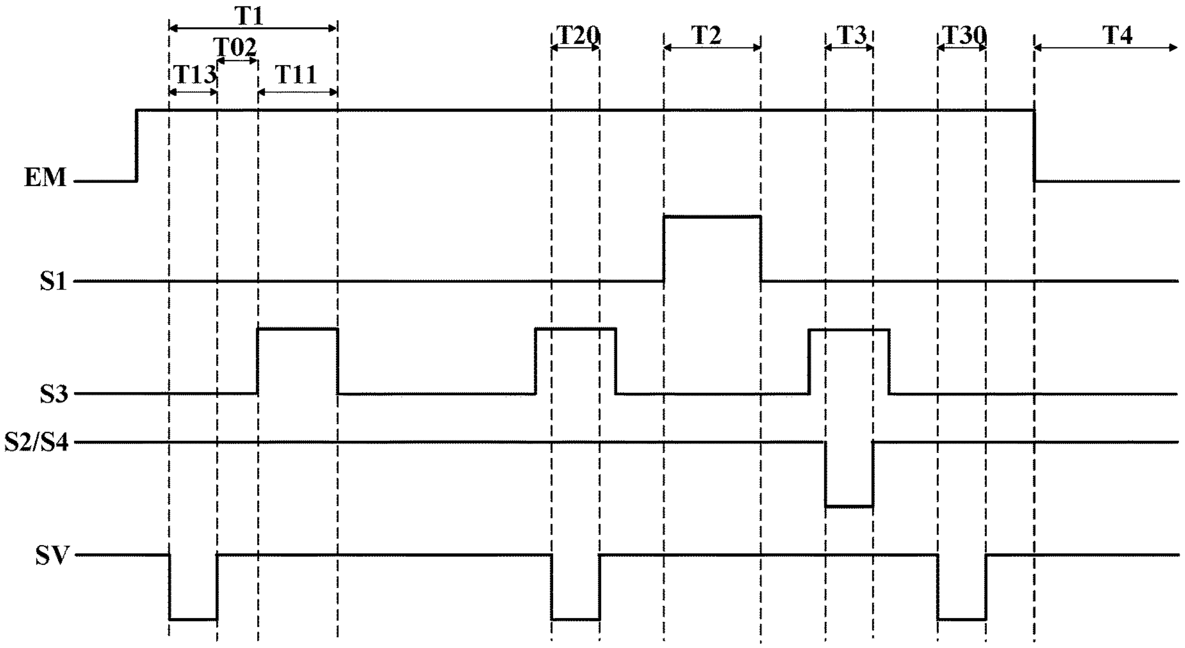
FIG. 16 is a working timing diagram of another pixel circuit in a display panel according to an embodiment of the present disclosure.

In other embodiments, FIG. 16 is a working timing diagram of another pixel circuit in a display panel according to an embodiment of the present disclosure. Referring to FIG. 10 and FIG. 16, the third stage T13 and the first stage T11 are performed sequentially, and a second interval stage T02 may further be included between the end of the third stage T13 and the start of the first stage T11.

In an embodiment, when the bias adjustment module 17 and the compensation module 13 are turned on simultaneously, the bias adjustment signal V0 is written into the first electrode of the drive transistor T, the second electrode of the drive transistor T and the gate of the drive transistor T simultaneously; as a result, the potential of the gate of the drive transistor T is affected, the data signal Vdata carried by the gate of the drive transistor T may be cleared, and thus different degrees of bias adjustment cannot be performed on the drive transistor T according to different gray scales. Thus, when the display panel works at a relatively-low frequency and the drive cycle of the pixel circuit is sufficiently long, the time duration of the non-light emission stage in one drive cycle may be appropriately extended, that is, the time duration of the first bias adjustment stage T1 may be appropriately extended; therefore, an extra time exists in the first bias adjustment stage T1 for setting the second interval stage T02. The third stage T13 and the first stage T11 are separated by the second interval stage T02, that is, after the third stage T13 ends, the first stage T11 is not entered immediately, but after the second interval stage T02, the first stage T11 is entered; in this manner, it is ensured that the bias adjustment module 17 and the compensation module 13 are not turned on simultaneously, the target bias adjustment can be performed on the drive transistor T, and relatively-high bias adjustment requirements can be satisfied.

In an embodiment, with continued reference to FIG. 10 and FIG. 16, the time duration of the second interval stage T02 is shorter than the time duration of the third stage T13; and/or, the time duration of the second interval stage T02 is shorter than the time duration of the first stage T11.

In an embodiment, since the second interval stage T02 is set for separating the third stage T13 and the first stage T11, the process of the second interval stage T02 does not require a relatively-long time as long as during which the bias adjustment module 17 can be completely turned off. However, the third stage T13 is a process of providing the bias adjustment signal V0 for the first electrode of the drive transistor T and the second electrode of the drive transistor T, so that the process of the third stage T13 requires a relatively-long time to enable the bias adjustment signal V0 to be sufficiently written into the first electrode of the drive transistor T and the second electrode of the drive transistor T. Thus, the time duration of the second interval stage T02 should be shorter than the time duration of the third stage T13, so as to minimize the total time duration of the first bias adjustment stage T1. Similarly, the first stage T11 is a process of balancing the potential of the gate of the drive transistor T and the potential of the electrode of the drive transistor T and thus requires a certain time duration for the potential of the gate of the drive transistor T to be consistent with the potential of the electrode of the drive transistor T. Therefore, the time duration of the second interval stage T02 should also be shorter than the time duration of the first stage T11 so that the time duration of the first bias adjustment stage T1 can be shortened as much as possible.

Figure 17:
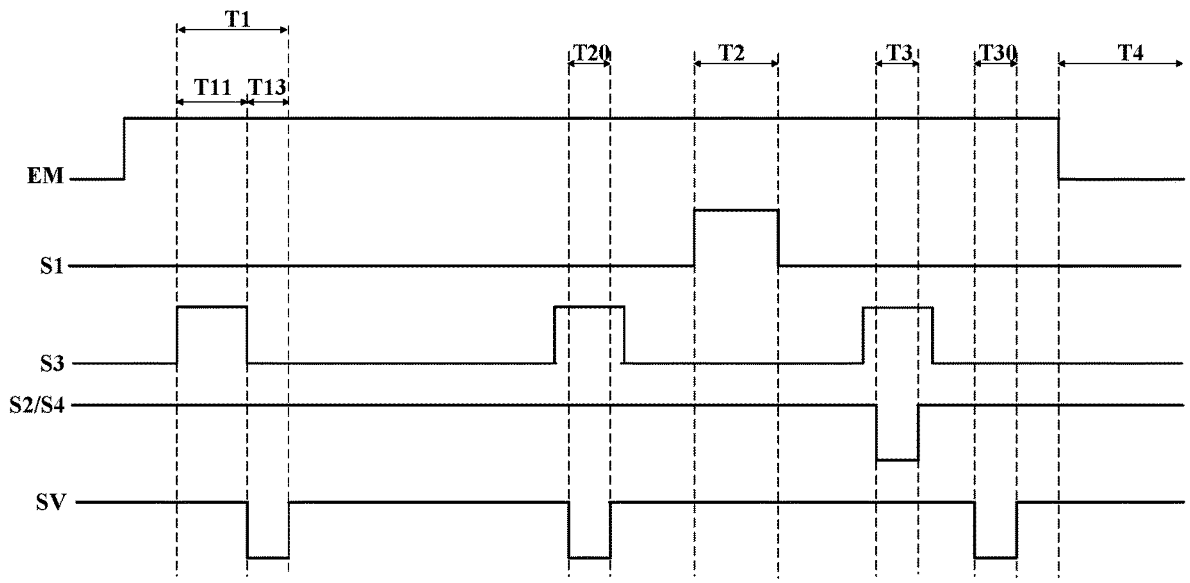
FIG. 17 is a working timing diagram of another pixel circuit in a display panel according to an embodiment of the present disclosure.

In other example embodiments, FIG. 17 is a working timing diagram of another pixel circuit in a display panel according to an embodiment of the present disclosure. Referring to FIG. 10 and FIG. 17, in the first stage T11, the potential of the gate of the drive transistor T is input into the second electrode of the drive transistor T to balance the potential difference between the gate of the drive transistor T and the second electrode of the drive transistor T. In the first stage T11, although the potential difference between the gate of the drive transistor T and the second electrode of the drive transistor T can be balanced, the bias adjustment on the drive transistor T is limited. At this time, the third stage T13 may be entered after the first stage T11 so that the bias adjustment signal V0 is written into the second electrode of the drive transistor T. The bias adjustment signal V0 is generally a relatively-high-level signal, so that after the bias adjustment signal V0 is written into the second electrode of the drive transistor T, the potential of the second electrode of the drive transistor T is higher than the potential of the gate of the drive transistor T, which is opposite to the case where the potential of the gate of the drive transistor T is higher than the potential of the second electrode of the drive transistor T in the light emission stage T4, and thus the drive transistor T can quickly recover to an unbiased state.

In an embodiment, with continued reference to FIG. 10 and FIG. 17, the first bias adjustment stage T1 is a non-light emission stage, so that in a case where the drive cycle of the pixel circuit is constant and the time duration of the non-light emission stage is relatively long, the time duration of the light emission stage T4 of the drive cycle is relatively shortened, thereby affecting the overall display light emission brightness of the display panel. In addition, for a display panel working at a relatively-high frequency, the drive cycle of the pixel circuit 10 of the display panel is relatively short; to ensure that the display panel has sufficient display brightness, the time duration of the non-light emission stage in one drive cycle may be shortened as much as possible; at this time, the third stage T13 may be turned on at the end of the first stage T11, that is, the end occasion of the first stage T11 is the same occasion as the start occasion of the third stage T13, so that the time duration of the light emission stage T4 is relative increased, which is conducive to improving the display brightness of the display panel and improving the display effect of the display panel.

Figure 18:
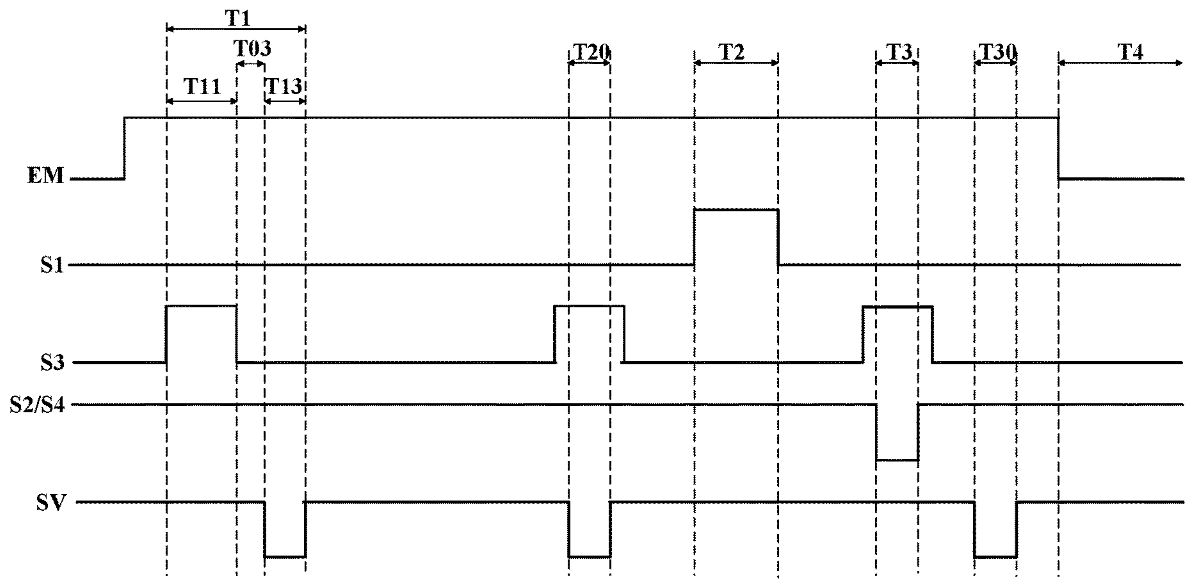
FIG. 18 is a working timing diagram of another pixel circuit in a display panel according to an embodiment of the present disclosure.

In other embodiments, FIG. 18 is a working timing diagram of another pixel circuit in a display panel according to an embodiment of the present disclosure. Referring to FIG. 10 and FIG. 18, the first stage T11 and the third stage T13 are performed sequentially, and a third interval stage T03 may further be included between the end of the first stage T11 and the start of the third stage T13.

Thus, when the display panel works at a relatively-low frequency and the drive cycle of the pixel circuit is sufficiently long, the time duration of the non-light emission stage in one drive cycle may be appropriately extended, that is, the time duration of the first bias adjustment stage T1 may be appropriately extended; therefore, an extra time exists in the first bias adjustment stage T1 for setting the third interval stage T03. The first stage T11 and the third stage T13 are separated by the third interval stage T03, that is, after the first stage T1*l* ends, the third stage T13 is not entered immediately, but after the third interval stage T03, the third stage T13 is entered, so that it is ensured that the first stage T11 and the third stage T13 do not affect each other.

In an embodiment, with continued reference to FIG. 10 and FIG. 18, the time duration of the third interval stage T03 is shorter than the time duration of the first stage T11; and/or, the time duration of the third interval stage T03 is shorter than the time duration of the third stage T13.

Since the third interval stage T03 is set for separating the first stage T11 and the third stage T13, the process of the third interval stage T03 does not require a relatively-long time duration. At this time, the time duration of the third interval stage T03 is shorter than the time duration of the first stage T11, and/or the time duration of the third interval stage T03 is shorter than the third stage T13, so as to shorten the total time duration of the first bias adjustment stage T1 as much as possible on the premise that the first stage T11 and the third stage T13 do not affect each other.

It is to be noted that in the first stage T11, only the compensation module 13 is turned on so that the potential of the gate of the drive transistor T flows to the second electrode of the drive transistor T, that is, the potential of the first node N1 flows to the third node N3, and neither the first node N1 nor the second node N3 is connected to other electrical signals; as a result, this process is similar to a charging and discharging process of a capacitor and is relatively slow; if it is desired to enable the potential of the gate of the drive transistor T to be consistent with the potential of the second electrode of the drive transistor T, the first stage T11 of the first bias adjustment stage T1 requires a relatively-long time. In the third stage T13, only the bias adjustment module 17 is turned on so that the external bias adjustment signal V0 is input into the gate of the drive transistor T; this process is a writing process of the bias adjustment signal V0 at a fixed potential, so that the first electrode of the drive transistor T and the second electrode of the drive transistor T can be charged to the bias adjustment signal V0 without an excessive long time. Therefore, on the basis of ensuring that a good bias adjustment can be performed on the drive transistor T both in the first stage T11 and in the third stage T13, the time duration of the first stage T11 may be set longer than the time duration of the third stage T13 to shorten the time duration of the first bias adjustment stage T1 as much as possible, so as to ensure that the display panel has sufficient display brightness, which is conducive to improving the display effect of the display panel.

In other embodiments of the present disclosure, the time duration of the first stage may also be shorter than the time duration of the third stage. At this time, in the third stage, the bias adjustment signal can be sufficiently written into the first electrode of the drive transistor and the second electrode of the drive transistor through the turned-on bias adjustment module to perform a sufficient bias adjustment on the first electrode of the drive transistor and the second electrode of the drive transistor, so that a display mode which poses high requirements on the bias adjustment effect can be applied.

It is to be noted that cases are merely exemplarily illustrated above where the first bias adjustment stage includes only the first stage, or the first bias adjustment stage includes both the first stage and the second stage, or the first bias adjustment stage includes both the first stage and the third stage. In other embodiments of the present disclosure, the first bias adjustment stage may include all the first stage, the second stage and the third stage.

In an embodiment, with continued reference to any one of FIG. 10 to FIG. 13, when the first bias adjustment stage includes all the first stage, the second stage and the third stage, the third stage, the first stage and the second stage may be performed sequentially. In the first stage, the bias adjustment module 17, the data write module 12 and the reset module 14 are turned off, and the compensation module 13 is turned on; in the second stage, the compensation module 13 is turned off, and the reset module 14 is turned on; in the third stage, the bias adjustment module 17 is turned on, and the compensation module 13 is turned off. A first interval stage is included between the end of the first stage and the start of the second stage, and a second interval stage is included between the end of the third stage and the start of the first stage. The time duration of the first interval stage is t1, the time duration of the second interval stage is t2, and t1≠t2.

Figure 19:
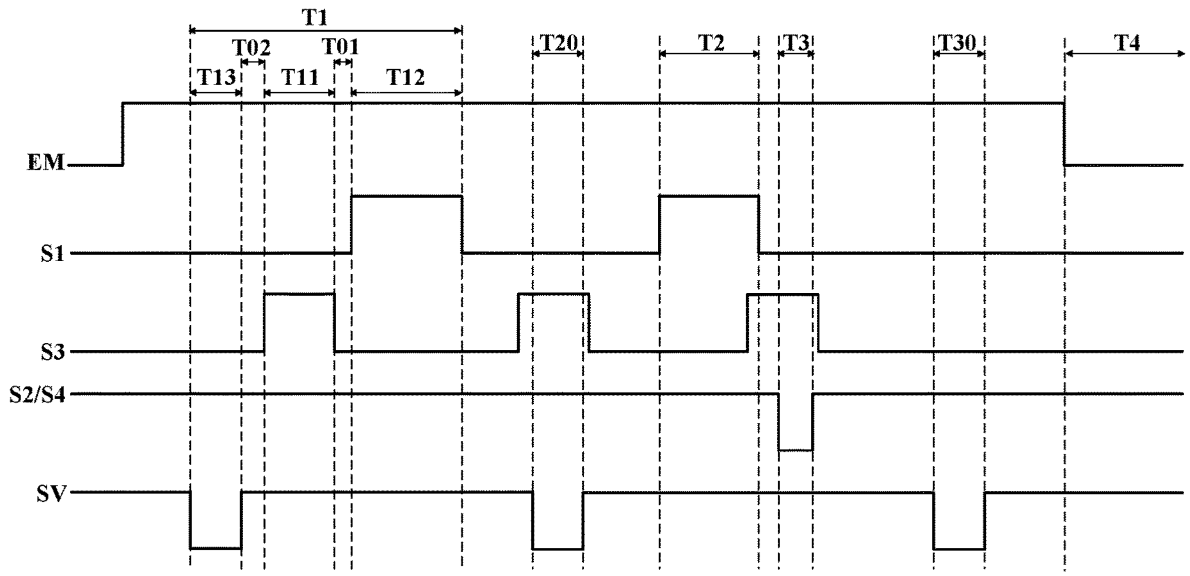
FIG. 19 is a working timing diagram of another pixel circuit in a display panel according to an embodiment of the present disclosure.

In an embodiment, the pixel circuit shown in FIG. 10 is continuously taken as an example. FIG. 19 is a working timing diagram of another pixel circuit in a display panel according to an embodiment of the present disclosure. Referring to FIG. 10 and FIG. 19, the third stage T13 of the first bias adjustment stage T1 is performed before the first stage T11 of the first bias adjustment stage T1, and the first stage T11 of the first bias adjustment stage T1 is performed before the second stage T12 of the first bias adjustment stage T1. In the third stage T13, the bias adjustment module 17 is turned on, and the bias adjustment signal V0 is sequentially input into the first electrode of the drive transistor T and the second electrode of the drive transistor T through the turned-on bias adjustment module 17, so that the second electrode of the drive transistor T carries the bias adjustment signal V0. After the third stage T13 ends and the first stage T11 is entered, the compensation module 13 is turned on, the bias adjustment module 17 is turned off, and the potential of the gate of the drive transistor flows to the second electrode of the drive transistor, so that the second electrode of the drive transistor T carries both the bias adjustment signal V0 and the data signal Vdata related to the grey scale. After the first stage T11 ends, the second stage T12 is entered, the compensation module 13 is turned off, and after the reset module 14 is turned on, the resetting signal Vref can be written into the gate of the drive transistor T, so that the gate of the drive transistor is reset to a relatively-low level. At this time, the potential of the gate of the drive transistor T is lower than the potential of the second electrode of the drive transistor T, and thus the bias state of the drive transistor T can be further corrected. In this manner, the third stage T13, the first stage T11 and the second stage T12 are performed sequentially, so that relatively-high bias adjustment requirements can be satisfied, and thus the display effect of the display panel is further improved.

In addition, the second interval stage T02 is set between the third stage T13 and the first stage T11, so that the third stage T13 and the first stage T11 do not affect each other; at the same time, the first interval stage T01 is set between the first stage T11 and the second stage T12, so that the first stage T11 and the second stage T12 do not affect each other. Therefore, relatively-high bias adjustment requirements can be satisfied under the premise that the targeted bias adjustment is performed on the drive transistor T. The time duration t1 of the first interval stage T01 may be the same as or different from the time duration t2 of the second interval stage T02. When the time duration t1 of the first interval stage T01 is different from the time duration t2 of the second interval stage T02, the time duration t1 of the first interval stage T01 and the time duration t2 of the second interval stage T02 may be set separately according to requirements.

In an embodiment, when the time duration t1 of the first interval stage T01 is different from the time duration t2 of the second interval stage T02, the time duration t1 of the first interval stage T01 may be shorter than the time duration t2 of the second interval stage T02, that is, t1<t2.

In other embodiments of the present disclosure, when the time duration t1 of the first interval stage T01 is different from the time duration t2 of the second interval stage T02, the time duration t1 of the first interval stage T01 may also be longer than the time duration t2 of the second interval stage T02, that is, t1>t2. The relationship between the time duration t1 of the first interval stage T01 and the time duration t2 of the second interval stage T02 is not specifically limited in the embodiment of the present disclosure.

It is to be noted that when the first bias adjustment stage includes all the first stage, the second stage and the third stage, the order of the first stage, the second stage and the third stage may be changed, which is not specifically limited in the embodiment of the present disclosure.

In an embodiment, with continued reference to any one of FIG. 10 to FIG. 13, when the first bias adjustment stage includes all the first stage, the second stage and the third stage, in the first stage, the bias adjustment module 17, the data write module 12 and the reset module 14 are turned off, and the compensation module 13 is turned on; in the second stage, the compensation module 13 is turned off, and the reset module 14 is turned on; and in the third stage, the bias adjustment module 17 is turned on, and the compensation module 13 is turned off, the first stage, the third stage and the second stage may be performed sequentially. A third interval stage may further be included between the end of the first stage and the start of the third stage, and a fourth interval stage may further be included between the end of the third stage and the start of the second stage. The time duration of the third interval stage is t3, the time duration of the fourth interval stage is t4, and it may be that t3≠t4.

Figure 20:
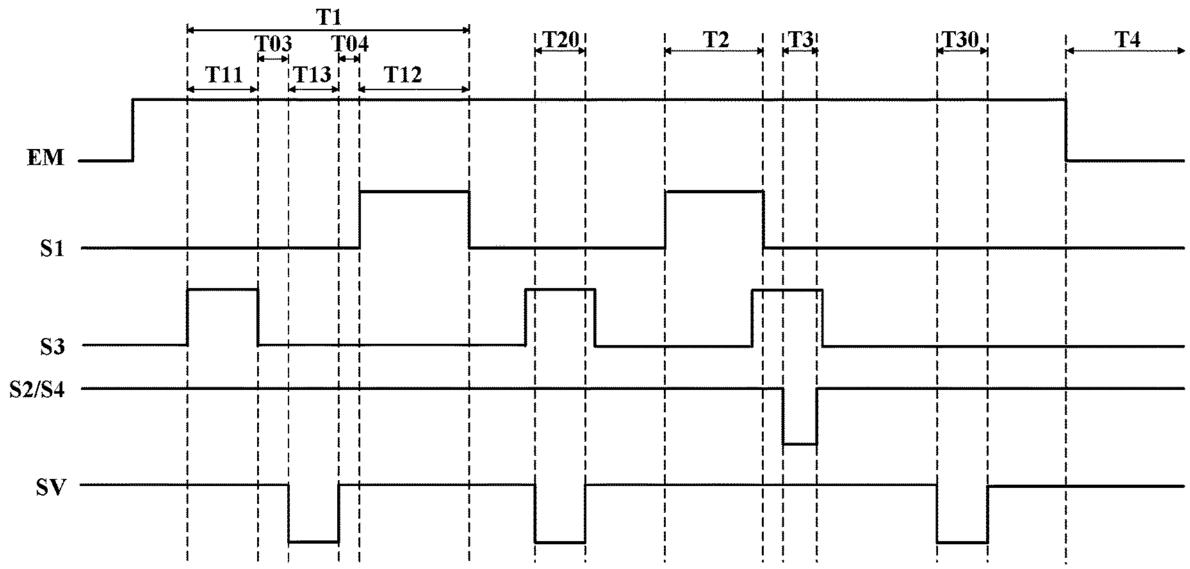
FIG. 20 is a working timing diagram of another pixel circuit in a display panel according to an embodiment of the present disclosure.

In an embodiment, the pixel circuit shown in FIG. 10 is continuously taken as an example. FIG. 20 is a working timing diagram of another pixel circuit in a display panel according to an embodiment of the present disclosure.

Referring to FIG. 10 and FIG. 20, the first stage T11 of the first bias adjustment stage T1 is performed before the third stage T13 of the first bias adjustment stage T1, and the third stage T13 of the first bias adjustment stage T1 is performed before the second stage T12 of the first bias adjustment stage T1. In the first stage T11, the compensation module 13 is turned on, and the potential of the gate of the drive transistor flows to the second electrode of the drive transistor to balance the potential difference between the gate of the drive transistor T and the second electrode of the drive transistor T at different gray scales, so that at the end of the first stage T11, both the gate of the drive transistor T and the second electrode of the drive transistor T carry the data signal. After the first stage T11 ends and the third stage T13 is entered, the compensation module 13 is turned off, the bias adjustment module 17 is turned on, and the bias adjustment signal V0 is sequentially input into the first electrode of the drive transistor T and the second electrode of the drive transistor T through the turned-on bias adjustment module 17, so that the second electrode of the drive transistor T has the bias adjustment signal V0 at a relatively-high level; at this time, no signal has been written into the gate of the drive transistor T, and the gate of the drive transistor T is at a relatively-low potential carrying the data signal, so that the potential of the gate of the drive transistor T is lower than the potential of the second electrode of the drive transistor T; therefore, the drive transistor T is reversely biased, and the drive transistor T can further tend to be an unbiased state under the effect of the reverse bias. After the third stage T13 ends and the second stage T12 is entered, the bias adjustment module 17 is turned off, and after the reset module 14 is turned on, the resetting signal Vref can be written into the gate of the drive transistor T, so that the gate of the drive transistor is reset to a relatively-low level; at this time, the potential of the gate of the drive transistor T is further lower than the potential of the second electrode of the drive transistor T, and thus the bias state of the drive transistor T can be further corrected. In this manner, the first stage T11, the third stage T13 and the second stage T12 are performed sequentially, so that relatively-high bias adjustment requirements can be satisfied, and thus the display effect of the display panel is further improved.

In addition, the third interval stage T03 is set between the first stage T11 and the third stage T13, so that the first stage T11 and the third stage T13 do not affect each other; at the same time, the fourth interval stage T04 is set between the third stage T13 and the second stage T12, so that the third stage T13 and the second stage T12 do not affect each other. Therefore, relatively-high bias adjustment requirements can be satisfied under the premise that the targeted bias adjustment is performed on the drive transistor T. The time duration t3 of the third interval stage T03 may be the same as or different from the time duration t4 of the fourth interval stage T04. When the time duration t3 of the third interval stage T03 is different from the time duration t4 of the fourth interval stage T04, the time duration t3 of the third interval stage T03 and the time duration t4 of the fourth interval stage T04 may be set separately according to requirements.

In an embodiment, when the time duration t3 of the third interval stage T03 is different from the time duration t4 of the fourth interval stage T04, the time duration t3 of the third interval stage T03 may be shorter than the time duration t4 of the fourth interval stage T04, that is, t3<t4.

In other embodiments of the present disclosure, when the time duration t3 of the third interval stage T03 is different from the time duration t4 of the fourth interval stage T04, the time duration t3 of the third interval stage T03 may also be longer than the time duration t4 of the fourth interval stage T04, that is, t3>t4. The relationship between the time duration t3 of the third interval stage T03 and the time duration t4 of the fourth interval stage T04 is not specifically limited in the embodiment of the present disclosure.

It is to be understood that in the case where the third stage, the first stage and the second stage are performed sequentially, the first interval stage is set between the first stage and the second stage, and the second interval stage is set between the third stage and the first stage; in the case where the first stage, the third stage and the second stage are performed sequentially, the third interval stage is set between the first stage and the third stage, and the fourth interval stage is set between the third stage and the second stage; that is, an interval stage is set between adjacent two stages of the first bias adjustment stage so that the adjacent two stages are separated from each other. Thus, a better bias adjustment effect can be achieved for a display panel working at a relatively-low frequency. However, for a display panel working at a relatively-high frequency, the time duration of the first bias adjustment stage needs to be further reduced.

In an embodiment, with continued reference to any one of FIG. 10 to FIG. 13, when the first bias adjustment stage includes all the first stage, the second stage and the third stage, in the first stage, the bias adjustment module 17, the data write module 12 and the reset module 14 are turned off, and the compensation module 13 is turned on; in the second stage, the compensation module 13 is turned off, and the reset module 14 is turned on; and in the third stage, the bias adjustment module 17 is turned on, and the compensation module 13 is turned off, the second stage at least partially overlaps the third stage.

Figure 21:
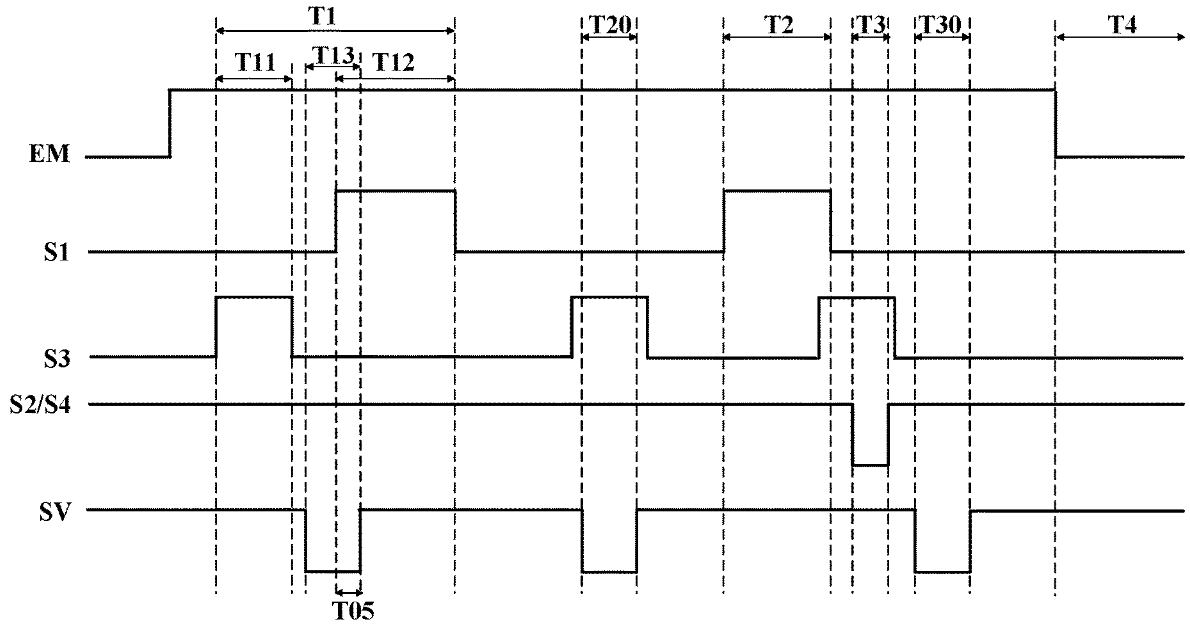
FIG. 21 is a working timing diagram of another pixel circuit in a display panel according to an embodiment of the present disclosure.

In an embodiment, the pixel circuit shown in FIG. 10 is taken as an example. FIG. 21 is a working timing diagram of another pixel circuit in a display panel according to an embodiment of the present disclosure. Referring to FIG. 10 and FIG. 21, an overlap T05 exists between the third stage T13 and the second stage T12, and during the overlap TO5, the bias adjustment module 17 and the reset module 14 are turned on simultaneously, that is, the process of the reset module 14 writing the resetting signal into the gate of the drive transistor T and the process of the bias adjustment module 17 writing the bias adjustment signal V0 into the first electrode of the drive transistor T and the second electrode of the drive transistor T are performed simultaneously; and at this time, the compensation module 13 is in an turned-off state, so that the process of resetting the gate of the drive transistor T and the process of the bias adjustment on the first electrode of the drive transistor T and the second electrode of the drive transistor T do not affect each other. Thus, under the premise that the time duration of the third stage T13 and the time duration of the second stage T12 are constant, the third stage T13 at least partially overlaps the second stage T12, so that the total time duration of the first bias adjustment stage T1 can be shortened, which is conducive to shortening the time duration of the non-light emission stage, and thus the display brightness of the display panel can be improved; or under the premise that the time duration of the first bias adjustment stage T1 is constant, the third stage T13 at least partially overlaps the second stage T12, so that the time duration of the third stage T13 and/or the time duration of the second stage T12 can be relatively increased, and thus higher bias adjustment requirements can be satisfied.

In an embodiment, when the second stage T12 at least partially overlaps the third stage T13, the start time of the second stage T12 may be the same as or earlier than the start time of the third stage T13; and/or the end time of the second stage T12 is the same as or later than the end time of the third stage T13.

Figure 22:
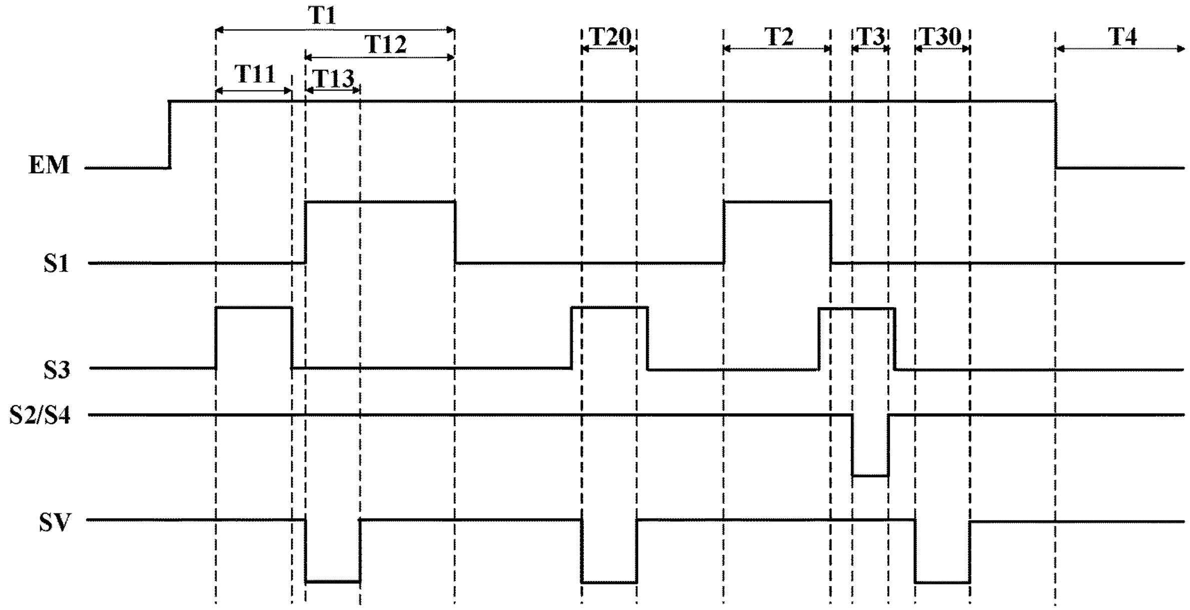
FIG. 22 is a working timing diagram of another pixel circuit in a display panel according to an embodiment of the present disclosure.

In an embodiment, FIG. 22 is a working timing diagram of another pixel circuit in a display panel according to an embodiment of the present disclosure. Referring to FIG. 10 and FIG. 22, the start time of the second stage T12 is the same as the start time of the third stage T13, and the end time of the second stage T12 is later than the end time of the third stage T13. At this time, when the second stage T12 is entered, the third stage T13 is entered simultaneously, so that when the resetting signal Vref is written into the gate of the drive transistor T, the bias adjustment signal V0 is simultaneously written into the first electrode of the drive transistor T and the second electrode of the drive transistor T. At the same time, since the end time of the second stage T12 is later than the end time of the third stage T13, that is, after the bias adjustment module 17 is turned off and stops writing the bias adjustment signal V0 to the first electrode of the drive transistor T and the second electrode of the drive transistor T, the reset module 14 still remains in an turned-on state, so that the resetting signal Vref continues to be written to ensure that the gate of the drive transistor T can be sufficiently reset, thus the potential of the gate of the drive transistor T is far lower than the potential of the second electrode of the drive transistor T, and it is ensured that the drive transistor T can quickly recover to an unbiased state. Thus, the time duration of the second stage T12 is longer than the time duration of the third stage T13.

Figure 23:
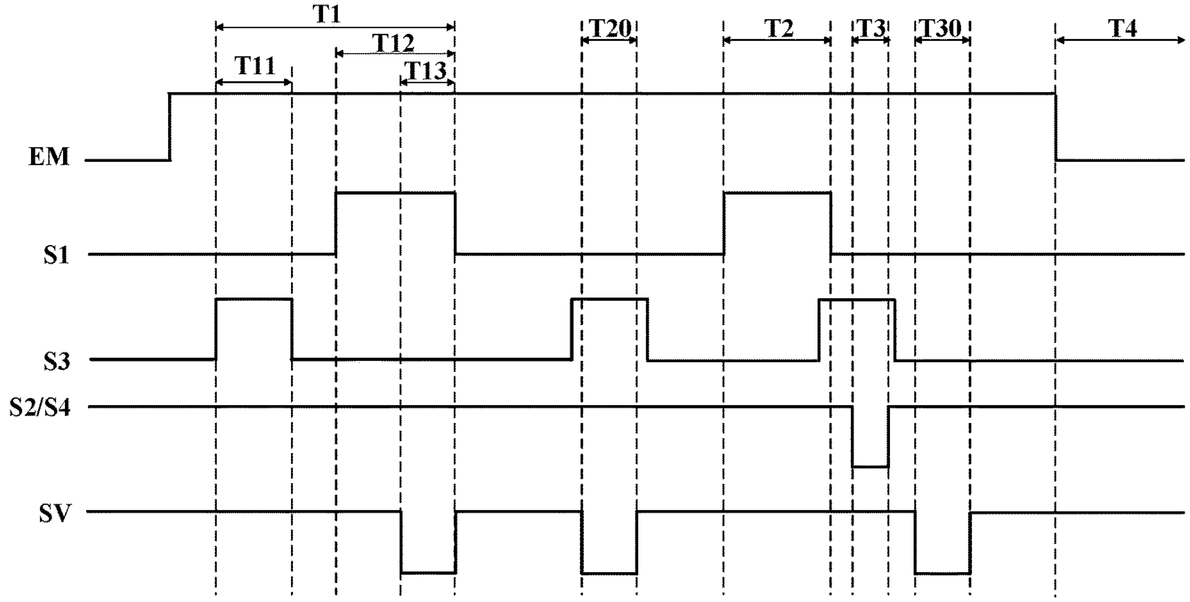
FIG. 23 is a working timing diagram of another pixel circuit in a display panel according to an embodiment of the present disclosure.

In another embodiment, FIG. 23 is a working timing diagram of another pixel circuit in a display panel according to an embodiment of the present disclosure. Referring to FIG. 10 and FIG. 23, the start time of the second stage T12 is earlier than the start time of the third stage T13, and the end time of the second stage T12 is the same as the end time of the third stage T13. At this time, after the second stage T12 is entered, the reset module 14 writes the resetting signal Vref into the gate of the drive transistor T first to reset the gate of the drive transistor T, and the third stage T13 is entered after a period of time of resetting. At this time, the bias adjustment module 17 and the reset module 14 are turned on simultaneously so that the resetting signal Vref continues to be written into the gate of the drive transistor T, and at the same time, the bias adjustment signal V0 is written into the first electrode of the drive transistor T and the second electrode of the drive transistor T. At the end of the second stage T12, the third stage T13 ends synchronously, and the writing of signals into the gate of the drive transistor, the first electrode of the drive transistor and the second electrode of the drive transistor T is stopped. Thus, the time duration of the second stage T12 is also longer than the time duration of the third stage T13.

Figure 24:
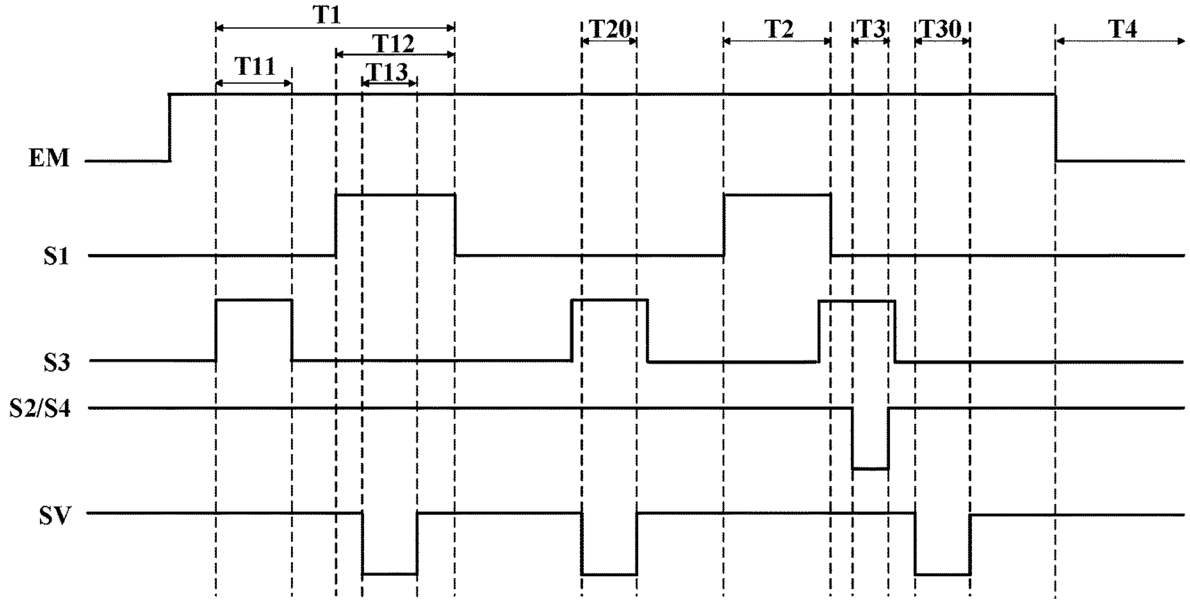
FIG. 24 is a working timing diagram of another pixel circuit in a display panel according to an embodiment of the present disclosure.

In another example embodiment, FIG. 24 is a working timing diagram of another pixel circuit in a display panel according to an embodiment of the present disclosure. Referring to FIG. 10 and FIG. 24, the start time of the second stage T12 is earlier than the start time of the third stage T13, and the end time of the second stage T12 is later than the end time of the third stage T13. At this time, after the second stage T12 is entered, the reset module 14 writes the resetting signal Vref into the gate of the drive transistor T first to reset the gate of the drive transistor T, and the third stage T13 is entered after a period of time of resetting. At this time, the bias adjustment module 17 and the reset module 14 are turned on simultaneously so that the resetting signal Vref continues to be written into the gate of the drive transistor T, and at the same time, the bias adjustment signal V0 is written into the first electrode of the drive transistor T and the second electrode of the drive transistor T. At the end of the third stage T13, the second stage T12 continues, that is, after the bias adjustment module 17 is turned off, the reset module 14 remains in an turned-on state; after the second stage T2 ends, the reset module 14 is turned off and does not provide the resetting signal Vref for the drive transistor. Thus, the time duration of the second stage T12 is also longer than the time duration of the third stage T13.

It is to be understood that the case is merely exemplarily illustrated above where the time duration of the second stage T12 is longer than the time duration of the third stage T13. In the embodiment of the present disclosure, the time duration of the second stage T12 may also be equal to the time duration of the third stage T13, in which case the start time of the second stage T12 is the same as the start time of the third stage T13, and the end time of the second stage T12 is the same as the end time of the third stage T13.

In other embodiments of the present disclosure, the start time of the second stage may be earlier than the start time of the third stage, and the end time of the second stage may also be earlier than the end time of the third stage.

Figure 25:
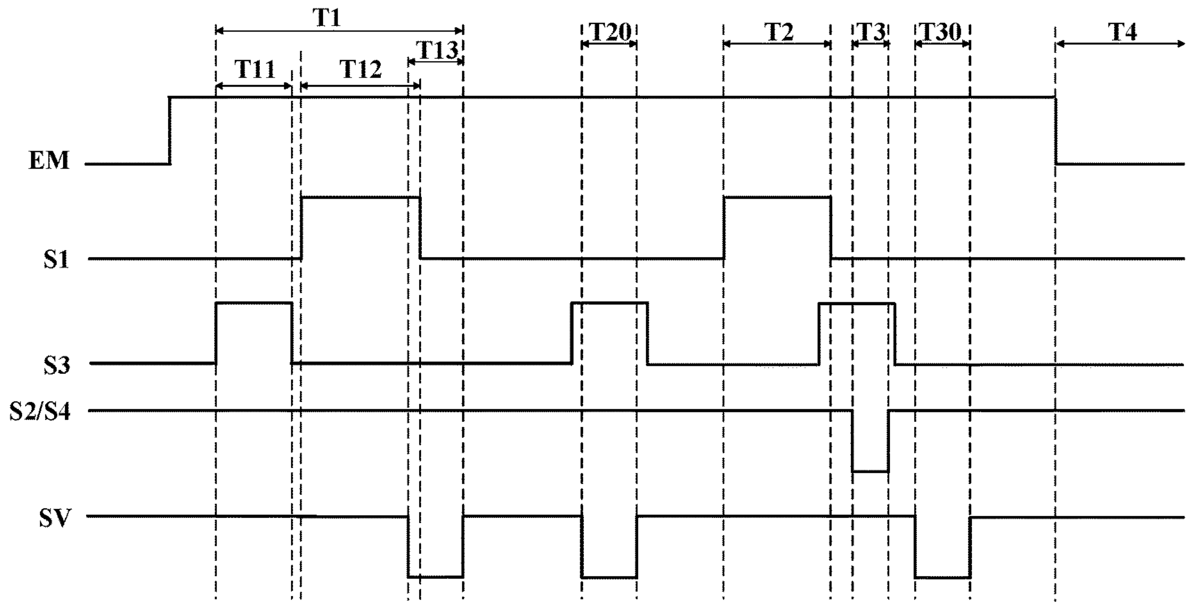
FIG. 25 is a working timing diagram of another pixel circuit in a display panel according to an embodiment of the present disclosure.

In an embodiment, the pixel circuit shown in FIG. 10 is continuously taken as an example. FIG. 25 is a working timing diagram of another pixel circuit in a display panel according to an embodiment of the present disclosure. Referring to FIG. 10 and FIG. 25, when the start time of the second stage T12 is earlier than the start time of the third stage T13, and the end time of the second stage T12 is earlier than the end time of the third stage T13, after the second stage T12 is entered, the reset module 14 is turned on, the bias adjustment module 17 is turned off, and the reset module 14 writes the resetting signal Vref to the gate of the drive transistor T first to reset the gate of the drive transistor T. After a period of time of resetting, the third stage T13 is entered. At this time, the bias adjustment module 17 and the reset module 14 are turned on simultaneously so that the resetting signal Vref continues to be written into the gate of the drive transistor T, and at the same time, the bias adjustment signal V0 is written into the first electrode of the drive transistor T and the second electrode of the drive transistor T. After the bias adjustment module 17 and the reset module 14 are synchronously turned on for a period of time, the second stage T12 ends and the third stage T13 continues. At this time, the reset module 14 is turned off, the bias adjustment module 17 remains turned-on and continues to provide the bias adjustment signal V0 for the first electrode of the drive transistor T and the second electrode of the drive transistor T; after the third stage T13 ends, the bias adjustment module 17 is turned off.

It is to be noted that the above only takes FIG. 10 as an example to illustrate the working process of the pixel circuit in different cases, and when the pixel circuit is in other cases, the scan signal, the light emission control signal, the bias adjustment signal, the data signal and the resetting signal may be adaptively adjusted, and the preceding beneficial effects can also be achieved, which is not repeated here.

Based on the same inventive concept, an embodiment of the present disclosure further provides a display device. The display device includes the display panel provided in the embodiments of the present disclosure. Therefore, the display device has the technical features of the display panel and the drive method of the display panel provided in the embodiments of the present disclosure and can achieve the beneficial effects of the display panel provided in the embodiments of the present disclosure. For the similarities, reference may be made to the preceding description of the display panel provided in the embodiments of the present disclosure, which is not repeated here.

Figure 26:
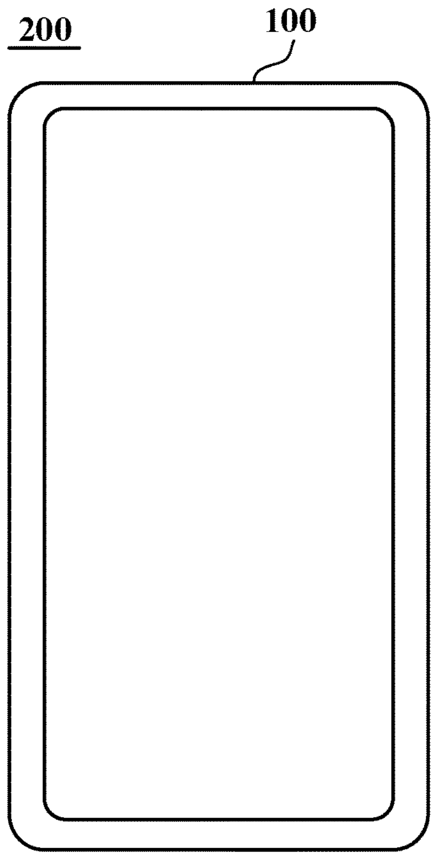
FIG. 26 is a structural view of a display device according to an embodiment of the present disclosure.

In an embodiment, FIG. 26 is a structural view of a display device according to an embodiment of the present disclosure. As shown in FIG. 26, the display device 200 includes the display panel 100 provided in the embodiments of the present disclosure. The display device 200 provided in the embodiment of the present application may be any electronic product with a display function, including but not limited to: phones, televisions, laptops, desktop displays, tablet computers, digital cameras, smart bracelets, smart glasses, in-vehicle displays, medical displays, industrial control equipment, touch interactive terminals, etc., which is particularly limited in the embodiment of the present application.

It is to be understood that various forms of working processes of the pixel circuit shown above may be adopted with stages reordered, added or deleted. For example, the stages in the working process of the pixel circuit described in the present disclosure may be performed in parallel, sequentially or in different orders, as long as the desired results of the technical solutions of the present disclosure can be achieved, and no limitation is imposed herein.

The preceding embodiments do not limit the scope of the present disclosure. It is to be understood by those skilled in the art that various modifications, combinations, sub-combinations, and substitutions may be performed according to design requirements and other factors. Any modification, equivalent substitution, improvement and the like made within the spirit and principle of the present disclosure is within the scope of the present disclosure.

What is claimed is:

1. A display panel, comprising:

a pixel circuit and a light-emitting element, wherein the pixel circuit comprises a drive module, a data write module, a compensation module and a reset module, wherein the drive module comprises a drive transistor;

the data write module is connected to a first electrode of the drive transistor;

the compensation module is connected between a gate of the drive transistor and a second electrode of the drive transistor; and the reset module is connected to the gate of the drive transistor or the second electrode of the drive transistor;

wherein a working process of the pixel circuit comprises a first bias adjustment stage, and the first bias adjustment stage comprises a first stage; and in the first stage, the data write module and the reset module are turned off, and the compensation module is turned on;

wherein the pixel circuit further comprises a bias adjustment module, and the bias adjustment module is connected to the first electrode of the drive transistor or the second electrode of the drive transistor; and in the first stage, the bias adjustment module is turned off; and wherein the first bias adjustment stage further comprises a third stage, the first stage and the third stage are performed sequentially; and in the third stage, the bias adjustment module is turned on, and the compensation module is turned off.

2. The display panel according to claim 1, wherein, a time duration of the first stage is longer than a time duration of the third stage.

3. The display panel according to claim 1, wherein, the first stage starts at an end of the third stage; or the third stage starts at an end of the first stage.

4. The display panel according to claim 1, wherein, a third interval stage is located between an end of the first stage and a start of the third stage.

5. The display panel according to claim 4, wherein the third interval stage satisfies at least one of:

a time duration of the third interval stage is shorter than a time duration of the first stage; or a time duration of the third interval stage is shorter than a time duration of the third stage.

6. The display panel according to claim 1, wherein, the first bias adjustment stage further comprises a second stage, and the first stage, the third stage and the second stage are performed sequentially, wherein in the second stage, the compensation module is turned off, and the reset module is turned on;

a third interval stage is located between an end of the first stage and a start of the third stage, and a fourth interval stage is located between an end of the third stage and a start of the second stage, wherein a time duration of the third interval stage is $t3$, a time duration of the fourth interval stage is $t4$, and $t3 \neq t4$.

7. The display panel according to claim 6, wherein $t3 < t4$.

8. The display panel according to claim 1, wherein, the first bias adjustment stage further comprises a second stage;

in the second stage, the compensation module is turned off, and the reset module is turned on;

the second stage at least partially overlaps the third stage.

9. The display panel according to claim 8, wherein the second stage satisfies at least one of:

a start time of the second stage is the same as or earlier than a start time of the third stage; or an end time of the second stage is the same as or later than an end time of the third stage.

10. The display panel according to claim 8, wherein, a start time of the second stage is earlier than a start time of the third stage; and an end time of the second stage is earlier than an end time of the third stage.

11. The display panel according to claim 1, wherein, the first bias adjustment stage further comprises a second stage, and the first stage and the second stage are performed sequentially; and in the second stage, the compensation module is turned off, and the reset module is turned on.

12. The display panel according to claim 11, wherein, a time duration of the first stage is longer than a time duration of the second stage.

13. The display panel according to claim 11, wherein, the second stage starts at an end of the first stage.

14. The display panel according to claim 11, wherein, a first interval stage is located between an end of the first stage and a start of the second stage.

15. A display panel, comprising:

a pixel circuit and a light-emitting element, wherein the pixel circuit comprises a drive module, a data write module, a compensation module and a reset module, wherein the drive module comprises a drive transistor;

the data write module is connected to a first electrode of the drive transistor;

the compensation module is connected between a gate of the drive transistor and a second electrode of the drive transistor; and the reset module is connected to the gate of the drive transistor or the second electrode of the drive transistor;

wherein a working process of the pixel circuit comprises a first bias adjustment stage, and the first bias adjustment stage comprises a first stage; and in the first stage, the data write module and the reset module are turned off, and the compensation module is turned on;

the first bias adjustment stage further comprises a second stage, and the first stage and the second stage are performed sequentially; and in the second stage, the compensation module is turned off, and the reset module is turned on.

16. The display panel according to claim 15, wherein, a time duration of the first stage is longer than a time duration of the second stage.

17. The display panel according to claim 15, wherein, the second stage starts at an end of the first stage.

18. The display panel according to claim 15, wherein, a first interval stage is located between an end of the first stage and a start of the second stage.

19. The display panel according to claim 18, wherein the first interval stage satisfies at least one of:

a time duration of the first interval stage is shorter than a time duration of the first stage; or a time duration of the first interval stage is shorter than a time duration of the second stage.

20. A display device, comprising a display panel, wherein the display panel comprises:

a pixel circuit and a light-emitting element, wherein the pixel circuit comprises a drive module, a data write module, a compensation module and a reset module, wherein the drive module comprises a drive transistor;

the data write module is connected to a first electrode of the drive transistor;

the compensation module is connected between a gate of the drive transistor and a second electrode of the drive transistor; and the reset module is connected to the gate of the drive transistor or the second electrode of the drive transistor;

wherein a working process of the pixel circuit comprises a first bias adjustment stage, and the first bias adjustment stage comprises a first stage; and in the first stage, the data write module and the reset module are turned off, and the compensation module is turned on;

wherein the pixel circuit further comprises a bias adjustment module, and the bias adjustment module is connected to the first electrode of the drive transistor or the second electrode of the drive transistor; and in the first stage, the bias adjustment module is turned off; and wherein the first bias adjustment stage further comprises a third stage, the first stage and the third stage are performed sequentially; and in the third stage, the bias adjustment module is turned on, and the compensation module is turned off.

* * * * *